US012746594B2

(12) United States Patent
Shaber

(10) Patent No.: US 12,746,594 B2
(45) Date of Patent: Sep. 29, 2026

(54) CONTINUOUS CASTING PARAMETER VALUE AND SET-UP CONDITION DETERMINATION USING ARTIFICIAL INTELLIGENCE

(71) Applicant: WAGSTAFF, INC., Spokane Valley, WA (US)

(72) Inventor: Craig Lee Shaber, Liberty Lake, WA (US)

(73) Assignee: WAGSTAFF, INC., Spokane Valley, WA (US)

( * ) Notice: Subject to any disclaimer, the term of this patent is extended or adjusted under 35 U.S.C. 154(b) by 493 days.

(21) Appl. No.: 18/498,787

(22) Filed: Oct. 31, 2023

(65) Prior Publication Data

US 2025/0135527 A1 May 1, 2025

(51) Int. Cl.
*B22D 11/16* (2006.01)
*B22D 11/049* (2006.01)
(Continued)

(52) U.S. Cl.
CPC ............ *B22D 11/16* (2013.01); *B22D 11/049* (2013.01); *B22D 46/00* (2013.01); *G06T 7/0002* (2013.01); *G06T 2207/20081* (2013.01)

(58) Field of Classification Search
CPC ...... B22D 11/049; B22D 11/16; B22D 46/00; G06T 7/0002; G06T 2207/20081; G06N 20/00; G06N 20/10; G06N 20/20
See application file for complete search history.

(56) References Cited

U.S. PATENT DOCUMENTS

2012/0241118 A1* 9/2012 Wagstaff .............. B22D 11/049 164/128
2022/0318667 A1 10/2022 Babu Balasubramani et al.
2023/0286038 A1* 9/2023 McCallum ........... B22D 11/141

FOREIGN PATENT DOCUMENTS

CN 114939643 B 3/2023
IT 2021-00015773 A1 12/2022

OTHER PUBLICATIONS

International Search Report and Written Opinion for PCT/US2024/053674 (ISR/EP) mailed Feb. 17, 2025 (15 pages).
(Continued)

*Primary Examiner* — Shane D Woolwine
(74) *Attorney, Agent, or Firm* — Alston & Bird LLP

(57) ABSTRACT

Provided herein is a system and method for parameter value determination of direct chill casting using artificial intelligence. The system may employ one or more image sensors configured to capture images of a surface of a direct chill cast billet or ingot, where the images depict one or more casting anomalies. A first machine learning model configured to process images is configured to identify, within the images, casting anomalies along with metrics of the casting anomalies or anomalies can be directly input to the first machine learning model. The casting anomalies are identified by the first machine learning model, classified through conditional statements according to anomaly type and scale. A second machine learning model is configured to process the casting anomaly type and scale as an input along with most parameters and set-up conditions that can cause the anomaly to generate changes to parameter values of the direct chill casting process to reduce or eliminate the casting anomalies.

20 Claims, 20 Drawing Sheets

(51) Int. Cl.
*B22D 46/00* (2006.01)
*G06T 7/00* (2017.01)

(56) References Cited

OTHER PUBLICATIONS

Rao et al., "*Parameters Optimization of Continuous Casting Process Using Teaching-Learning-Based Optimization Algorithm,*" S.V. National Institute of Technology, Surat, Gujarat—395007, India, pp. 540-547 © Springer-Verlag Berlin Heidelberg 2012.
Juang et al., "*Using Machine Learning to Establish the Relationship between Die Casting Parameters and the Casting Quality,*" Proceedings of the 7$^{th}$ World Congress on Mechanical, Chemical and Material Engineering (MCM''21), Virtual Conference—Aug. 2021, Paper No. ICMIE 107, DOI: 10.11159/icmie21.107 (8 pages).
Rao et al., "*Parameters optimization of selected casting processes using teaching-learning-based optimization algorithm,*" Elsevier, Applied Mathematical Modelling 38 (2014) 5593-5608 (17 pages).
Wu et al., "*Multiscale Convolutional and Recurrent Neural Network for Quality Prediction of Continuous Casting Slabs,*" Processes 2021, 9, 33 <https://dx.doi.org/10.3390/pr9010033> (16 pages).

* cited by examiner

Patent Parameter Summary Starting List

| Item # | Common Process Inputs | | Brief Explanation | |
|---|---|---|---|---|
| | Speed | | Rate of platform descent. | |
| 1 | | Start Speed | Rate platform descends when it first starts to move. | PV and CV relative to cast length |
| 2 | | Start Speed Delay | Cast length that the platen descends at start speed. | PV and CV relative to cast length |
| 3 | | Speed Ramp 1 | Rate of increase or decrease of platform descent from start speed. | PV and CV relative to cast length |
| 4 | | Speed Ramp 2 | Rate of increase or decrease of platform descent from end of previous ramp. | PV and CV relative to cast length |
| 5 | | Speed Ramp X | Rate of increase or decrease of platform descent from end of previous ramp. These ramps can be added as needed. | PV and CV relative to cast length |
| 6 | | Run Speed | Rate of descent during the steady state or run portion of the cast. | PV and CV relative to cast length |
| 7 | | Deceleration Ramp 1 | Rate of increase or decrease of platform descent from run speed. | PV and CV relative to cast length |
| 8 | | Deceleration Ramp 2 | Rate of increase or decrease of platform descent from end of previous ramp. These ramps can be added as needed. | PV and CV relative to cast length |
| 9 | | Deceleration Ramp X | Rate of increase or decrease of platform descent from end of previous ramp. | PV and CV relative to cast length |
| 10 | | End Speed | Rate of descent immediately prior to platform stop. | PV and CV relative to cast length |
| | Metal Level | | Level of metal in the mold relative to the mold tang. | |
| 11 | | Start down Metal Level | Mold metal level when platform starts down. | PV and CV relative to cast length |
| 12 | | Metal Level Point 1 | First metal level and cast length point to which metal level will ramp to. | PV and CV relative to cast length |
| 13 | | Metal Level Point 2 | Second metal level and cast length point to which metal level will ramp to. | PV and CV relative to cast length |
| 14 | | Metal Level Point 3 | Third metal level and cast length point to which metal level will ramp to. | PV and CV relative to cast length |
| 15 | | Metal Level Point 4 | Fourth metal level and cast length point to which metal level will ramp to. | PV and CV relative to cast length |
| 16 | | Metal Level Point X | X metal level and cast length point to which metal level will ramp to. These ramps can be added as needed. | PV and CV relative to cast length |
| 17 | | Run Metal Level | Metal level in the mold maintained at Run Speed. | PV and CV relative to cast length |
| 18 | | Deceleration Ramp 1 | First metal level and cast length point to which metal level will ramp to during deceleration. | PV and CV relative to cast length |
| 19 | | Deceleration Ramp 2 | Second metal level and cast length point to which metal level will ramp to during deceleration. | PV and CV relative to cast length |
| 20 | | Deceleration Ramp X | X metal level and cast length point to which metal level will ramp to during deceleration. These ramps can be added as needed. | PV and CV relative to cast length |
| 21 | | End Metal Level | Metal level immediately prior to platform stop. | PV and CV relative to cast length |
| 22 | Uncontrolled Fill length | | Depth of liquid metal in mold controlled by pin preset and not active PID (Proportional-Integral-Derivative) controller. | PV and CV |
| 23 | Cool down period | | Time before water shuts off after platform stop where operator cannot turn-off the water. | PV and CV |
| 24 | Water shut off time | | Time before water shuts off after platform stop. | PV and CV |
| 25 | Fill Rate 1 (each position) | | First rate of metal level rise in a mold during the fill stage starting when "uncontrolled fill length" is reached and prior to platform descent starting. | PV and CV |
| 26 | Fill Rate 2 (each position) | | Second rate of metal level rise in a mold during the fill stage starting when Fill Rate 1 completes and prior to platform descent starting. | PV and CV |
| 27 | Fill Rate 3 (each position) | | Third rate of metal level rise in a mold during the fill stage starting when Fill Rate 2 completes and prior to platform descent starting. | PV and CV |
| 28 | Fill Rate 4 (each position) | | Fourth rate of metal level rise in a mold during the fill stage starting when Fill Rate 3 completes and prior to platform descent starting. | PV and CV |
| 29 | Fill Rate 5 (each position) | | Fifth rate of metal level rise in a mold during the fill stage starting when Fill Rate 4 completes and prior to platform descent starting. | PV and CV |
| 30 | Pin preset 1 | | Percent opening between pin and spout of its full stroke for pin 1, which is closest to metal entry. | PV and CV |
| 31 | Pin preset 2 | | Percent opening between pin and spout of its full stroke for pin 2. | PV and CV |
| 32 | Pin preset 3 | | Percent opening between pin and spout of its full stroke for pin 3. | PV and CV |
| 33 | Pin preset 4 | | Percent opening between pin and spout of its full stroke for pin 4. | PV and CV |

FIG. 3

Patent Parameter Summary Starting List

| Item | Common Process Inputs | | Brief Explanation | What |
|---|---|---|---|---|
| 34 | Pin preset 5 | | Percent opening between pin and spout of its full stroke for pin 5. | |
| 35 | Pin preset X | | Percent opening between pin and spout of its full stroke for pin X. This repeats for however many strands are being cast. | PV and CV |
| | Water flow | | The water flow rate to an entire casting station or to individual molds. This can also be split into delivery to different parts of the mold with different values. | |
| 36 | | Start water | Water flow rate during the fill and until the start water delay is reached. | PV and CV relative to cast length |
| 37 | | Start water delay | Cast length where the water flow starts to ramp up from the start water value. | PV and CV relative to cast length |
| 38 | | Water Ramp 1 | Rate of increase or decrease in water from the start water flow rate, starting at the start water delay cast length. | PV and CV relative to cast length |
| 39 | | Water Ramp 2 | Rate of increase or decrease in water from the end of previous ramp. | PV and CV relative to cast length |
| 40 | | Water Ramp X | Rate of increase or decrease in water from the end of previous ramp. These ramps can be added as needed. | PV and CV relative to cast length |
| 41 | | Run Water | Water flow rate during the steady state or run portion of the cast. | PV and CV relative to cast length |
| 42 | | Water Ramp 1 | Rate of increase or decrease in water from the run water flow rate. | PV and CV relative to cast length |
| 43 | | Water Ramp 2 | Rate of increase or decrease in water from the end of previous ramp. These ramps can be added as needed. | PV and CV relative to cast length |
| 44 | | End Water | Water flow rate when the platform stops. | PV and CV relative to cast length |
| | Lubrication | | | PV and CV relative to cast length |
| 45 | | Oil On Time | Time in seconds with maximum pressure to allow one oil pulse. | PV and CV relative to cast length |
| 46 | | Oil Off Time | Time in seconds without pressure allowing the oil injectors to reset. | PV and CV relative to cast length |
| 47 | | Reset Pressure | Pressure that system must drop to, to allow injectors to reset. | PV and CV relative to cast length |
| 48 | | Fire Pressure | Pressure the system must achieve for the injectors to expel oil. | PV and CV relative to cast length |
| 49 | | # of Pulses | # of pulses to occur in each cycle. | PV and CV relative to cast length |
| 50 | | Cycle Time | Total time allowed for the injector pulses before starting the next sequence. | PV and CV relative to cast length |
| 51 | | Cast Start Oil Rate | Pulses and cycle time for the injectors while the mold is filling. | PV and CV relative to cast length |
| 52 | | Cast Oil Rate Step 1 | Cast length where the pulses and cycle time are changed for the first time to new values. | PV and CV relative to cast length |
| 53 | | Cast Oil Rate Step 2 | Cast length where the pulses and cycle time are changed for the second time to new values. | PV and CV relative to cast length |
| 54 | | Cast Oil Rate Step 3 | Cast length where the pulses and cycle time are changed for the third time to new values. | PV and CV relative to cast length |
| 55 | | Cast Oil Rate Step 4 | Cast length where the pulses and cycle time are changed for the Xth time to new values. These steps can be added as needed. | PV and CV relative to cast length |
| 56 | RF SplitJet valve pressure | | Air pressure needed to close the SplitJet valves (for butt curl control). | PV and CV relative to cast length |
| 57 | | RF SplitJet valve start to open length | Cast length where air pressure starts to decrease. | PV and CV relative to cast length |
| 58 | | RF SplitJet valve fully open length | Cast length where air pressure reaches 0. | PV and CV relative to cast length |
| 59 | EF SplitJet valve pressure | | Air pressure needed to close the SplitJet valves (for butt curl control). | PV and CV relative to cast length |
| 60 | | EF SplitJet valve start to open length | Cast length where air pressure starts to decrease. | PV and CV relative to cast length |
| 61 | | EF SplitJet valve fully open length | Cast length where air pressure reaches 0. | PV and CV relative to cast length |
| | Turbo | | Introduction of air to the water streams through tiny holes in the mold to reduce cooling at cast start. | |

FIG. 4

Patent Parameter Summary Starting List

| Item | Common Process Inputs | | Brief Explanation | |
|---|---|---|---|---|
| 62 | | Turbo Start Flow | Flow rate of air to the molds. | |
| 63 | | Turbo Start Flow Delay | Cast length that Turbo air starts to decrease. | |
| 64 | | Turbo Air Finish | Cast length that Turbo air flow reaches 0. | |
| | $CO_2$ flow | | Infusion of $CO_2$ into the water supply to reduce cooling at cast start. | |
| 65 | | $CO_2$ Start Flow | Flow rate of $CO_2$ to the molds. | PV and CV relative to cast length |
| 66 | | $CO_2$ Start Flow Delay | Cast length that $CO_2$ infusion starts to decrease. | PV and CV relative to cast length |
| 67 | | $CO_2$ Air Finish | Cast length that $CO_2$ flow reaches 0. | PV and CV relative to cast length |
| | APEX™ Mid Point Mold Wall Movement | | APEX midpoint setpoints with linear ramps between | |
| 68 | | APEX Mid Point Start Position | APEX mid point starting position prior to platform movement | PV and CV relative to cast length |
| 69 | | APEX Mid Point Position 2 | APEX mid point position at Cast Length 2 | PV and CV relative to cast length |
| 70 | | APEX Mid Point Position 3 | APEX mid point position at Cast Length 3 | PV and CV relative to cast length |
| 71 | | APEX Mid Point Position 4 | APEX mid point position at Cast Length 4 | PV and CV relative to cast length |
| 72 | | APEX Mid Point Position X | APEX mid point position at Cast Length X, points added as needed | PV and CV relative to cast length |
| | APEX™ Quarterpoint Mold Wall Movement | | APEX quarter point setpoints with linear ramps between | |
| 73 | | APEX Quarter Point Start Position | APEX quarter point starting position prior to platform movement | PV and CV relative to cast length |
| 74 | | APEX Quarter Point Position 2 | APEX quarter point position at Cast Length 2 | PV and CV relative to cast length |
| 75 | | APEX Quarter Point Position 3 | APEX quarter point position at Cast Length 3 | PV and CV relative to cast length |
| 76 | | APEX Quarter Point Position 4 | APEX quarter point position at Cast Length 4 | PV and CV relative to cast length |
| 77 | | APEX Quarter Point Position X | APEX quarter point position at Cast Length X, points added as needed | PV and CV relative to cast length |
| | Casting Gas | | Slip gas separating liquid metal from mold wall | |
| 78 | | Idle Pressure | Pressure in the casting gas system at the table when not casting. | PV and CV |
| 79 | | Start Pressure | Pressure in the casting gas system at the table achieved immediately after hold time. | PV and CV |
| 80 | | Run/Calibration Pressure | Pressure ramped down to steady state/run condition pressure. | PV and CV |
| 81 | | Ramp Up Start | Cast length when gas pressure and flow ramping starts. | PV and CV |
| 82 | | Ramp Up End | Cast length when gas pressure and flow ramping achieves start pressure and flow. | PV and CV |
| 83 | | Ramp Down Start | Cast length when gas pressure and flow start ramping down to Run/Calibration pressure and flow. | PV and CV |
| 84 | | Ramp Down End | Cast length when gas pressure and flow reach Run/Calibration pressure and flow. | PV and CV |
| 85 | | Idle Flow | Air flow rate at the idle pressure. | PV and CV |
| 86 | | Run/Calibration Flow | Air flow rate at the Run/Calibration Pressure. | PV and CV |
| 87 | | Start Flow | Air flow rate at start pressure | PV and CV |
| 88 | Tiltback offset | | Cast length distance prior to end cast length that the furnace starts tilting back to stop metal flow | PV and CV |
| 89 | Rod feeder speed | | Rate of grain refiner addition in length/unit time. | PV and CV |
| 90 | Rod feeder type | | Chemical composition of the grain refiner being used. | PV and CV |
| 91 | Cast length | | Desired final cast length of the cast product. | PV and CV |
| 92 | Trough level | | Metal level in the trough at a specified point. | PV and CV |
| 93 | | Furnace Exit | Metal level at the furnace exit spout. | PV and CV |
| 94 | | Deep bed filter entrance | Metal level at the deep bed filter entrance. | PV and CV |
| 95 | | Deep bed filter exit | Metal level at the deep bed filter exit. | PV and CV |
| 96 | | Degasser entrance | Metal level at the degasser entrance. | PV and CV |
| 97 | | Degasser exit | Metal level at the degasser exit. | PV and CV |
| 98 | | CFF entrance | Metal level at the CFF entrance. | PV and CV |
| 99 | | CFF exit | Metal level at the CFF exit. | PV and CV |
| 100 | | Ingot or billet table inlet | Metal level at the ingot launder or billet table inlet. | PV and CV |

FIG. 5

Patent Parameter Summary Starting List

| Item | Common Process Inputs | Brief Explanation | What is measured? |
|---|---|---|---|
| 101 | Ingot or billet table last position | Metal level at the ingot launder or billet table last position. | PV and CV |
| 102 | Water Temperature | Temperature of water coming to the casting pit. | PV and CV |
| | Metal Temperature | Temperature of metal at a specified location. | |
| 103 | Furnace top metal bath temp. | Temperature of metal at top of furnace metal bath. | PV and CV |
| 104 | Furnace middle bath temp. | Temperature of metal at middle of furnace metal bath. | PV and CV |
| 105 | Furnace bottom bath temp. | Temperature of metal at bottom of furnace metal bath. | PV and CV |
| 106 | Furnace exit temp. | Temperature of metal at furnace spout exit. | PV and CV |
| 107 | Deep bed filter entrance temp. | Temperature of metal at deep bed filter entrance. | PV and CV |
| 108 | Deep bed filter temp. | Temperature of metal in deep bed filter. | PV and CV |
| 109 | Deep bed filter exit temp. | Temperature of metal at deep bed filter exit. | PV and CV |
| 110 | Degasser entrance temp. | Temperature of metal at degasser entrance temp. | PV and CV |
| 111 | Degasser temp. | Temperature of metal in degasser. | PV and CV |
| 112 | Degasser exit temp. | Temperature of metal at degasser exit. | PV and CV |
| 113 | CFF entrance temp. | Temperature of metal at CFF entrance. | PV and CV |
| 114 | CFF temp. | Temperature of metal at CFF. | PV and CV |
| 115 | CFF exit temp. | Temperature of metal at CFF exit. | PV and CV |
| 116 | Ingot or billet table inlet temp. | Temperature of metal at ingot launder or billet table inlet. | PV and CV |
| 117 | Ingot or billet table last position temp. | Temperature of metal at ingot launder or billet table last position. | PV and CV |
| 118 | Furnace roof air temp. | Average air temperature inside the furnace. | PV and CV |
| | Refractory Temperature | | PV and CV |
| 119 | Furnace roof temp. | Temperature of the refractory roof in the furnace | PV and CV |
| 120 | Furnace metal level temp. | Temperature of the refractory at metal line in the furnace | PV and CV |
| 121 | Furnace bottom temp. | Temperature of the refractory at the bottom of the furnace | PV and CV |
| 122 | Furnace exit temp. | Temperature of the refractory at the furnace spout exit | PV and CV |
| 123 | Deep bed filter entrance temp. | Temperature of the deep bed filter entrance refractory | PV and CV |
| 124 | Deep bed filter center temp. | Temperature of the deep bed filter center refractory | PV and CV |
| 125 | Deep bed filter exit temp. | Temperature of the deep bed filter exit refractory | PV and CV |
| 126 | Degasser entrance temp. | Temperature of the degasser entrance refractory | PV and CV |
| 127 | Degasser temp. | Temperature of the degasser internal refractory | PV and CV |
| 128 | Degasser exit temp. | Temperature of the degasser exit refractory | PV and CV |
| 129 | CFF entrance temp. | Temperature of the CFF entrance refractory | PV and CV |
| 130 | CFF temp. | Temperature of the CFF internal refractory | PV and CV |
| 131 | CFF exit temp. | Temperature of the CFF exit refractory | PV and CV |
| 132 | Ingot or billet table inlet temp. | Temperature of the ingot or billet table entry refractory | PV and CV |
| 133 | Ingot or billet table last position temp. | Temperature of the ingot launder or billet table last position refractory | PV and CV |
| | Mechanical Records | | |
| | Mold Part # | Unique mold part # for tracking impact of mold components. | |
| 134 | Mold 1 | Unique mold part # for the first mold in the system. | Value |
| 135 | Mold 2 | Unique mold part # for the second mold in the system. | Value |

FIG. 6

Patent Parameter Summary Starting List

| | | Brief Explanation | |
|---|---|---|---|
| | Mold 3 | Unique mold part # for the third mold in the system. | |
| | Mold 4 | Unique mold part # for the fourth mold in the system. | |
| | Mold 5 | Unique mold part # for the fifth mold in the system. | |
| | Mold X | Unique mold part # for the Xth mold in the system, repeated for however many strands are being cast. | Value |
| | Graphite Part # | Unique graphite liner part # associated with the unique mold part # for tracking impact of casting liners. Smaller billets have 1 part #, Ingot molds would have 4, ARC molds could have up to 3 part #'s. | |
| 140 | Graphite Part 1 | Graphite part # for the first mold in the system. | Value |
| 141 | Graphite Part 2 | Graphite part # for the second mold in the system. | Value |
| 142 | Graphite Part 3 | Graphite part # for the third mold in the system. | Value |
| 143 | Graphite Part 4 | Graphite part # for the fourth mold in the system. | Value |
| 144 | Graphite Part 5 | Graphite part # for the fifth mold in the system. | Value |
| 145 | Graphite Part X | Graphite part # for the Xth mold in the system, repeated for however many strands are being cast. | Value |
| 146 | Mold last cleaned date | Cleaning date associated with the mold part #. | Value |
| 147 | Mold last cleaned problem code | Problem codes associated with the mold part # and date of cleaning. | Value |
| | Example Problems to be coded | | |
| 148 | plugged spray holes | Spray holes plugged with debris or mineral build-up. | Value |
| 149 | plugged baffle holes | Baffle holes plugged with debris or mineral build-up. | Value |
| 150 | damaged spray holes | Spray holes misshapen. | Value |
| 151 | damaged baffle holes | Baffle holes misshapen. | Value |
| 152 | missing o-rings | O-rings missing. | Value |
| 153 | damaged o-rings | O-rings cut or chipped. | Value |
| 154 | damaged SplitJet Valve | Dings, dents, missing seals on the SplitJet valve. | Value |
| 155 | damaged filter screen | Dings, dents, missing seals on the filter screen. | Value |
| 156 | dirty filter screen | Filter screen holes plugged with debris or mineral build-up. | Value |
| 157 | bent mold | Mold bent from original shape. | Value |
| 158 | bent cover | Top, side, or bottom cover bent from original shape. | Value |
| 159 | Stripped bolt holes | Bolt holes with damaged threads. | Value |
| | Starting Head by position | Unique Starting Head part # by position to match with mold part #'s. | |
| 160 | Starting Head 1 | Unique starting head part # for the first mold in the system. | Value |
| 161 | Starting Head 2 | Unique starting head part # for the second mold in the system. | Value |
| 162 | Starting Head 3 | Unique starting head part # for the third mold in the system. | Value |
| 163 | Starting Head 4 | Unique starting head part # for the fourth mold in the system. | Value |
| 164 | Starting Head 5 | Unique starting head part # for the fifth mold in the system. | Value |
| 165 | Starting Head X | Unique starting head part # for the Xth mold in the system, repeated for however many strands are being cast. | Value |
| 166 | Starting head last cleaned date | Cleaning date associated with the starting head part #. | Value |
| 167 | Starting head last cleaned problem code | Problem codes associated with the starting head part # and date of cleaning. | Value |
| | Example Problems to be coded | | |
| 168 | center cracks | Cracks in the center area of the starting head. | Value |
| 169 | rim cracks | Cracks on the outside rim of the starting head. | Value |
| 170 | rim damage | Dings and dents on the outside rim of the starting head. | |

FIG. 7

| Item | Common Process Inputs | Brief Explanation | |
|---|---|---|---|
| 171 | plugged drains | Metal, debris, or mineral build-up plugging the holes of drain plugs. | |
| 172 | damaged drain plugs | Dings and dents on the drain plugs that affect insertion or water flow through them. | |
| 173 | outside dimensions undersize | Movement of the starting head resulting in dimensions different than original design. | |
| 174 | Stripped bolt holes | Bolt holes with damaged threads. | |
| | Metal Chemistry Process Values(wt%) | Average percentage by weight of each element as a part of the metal alloy being cast | |
| 175 | Si | Weight % of Si | PV and CV |
| 176 | Fe | Weight % of Fe | PV and CV |
| 177 | Cu | Weight % of Cu | PV and CV |
| 178 | Mn | Weight % of Mn | PV and CV |
| 179 | Mg | Weight % of Mg | PV and CV |
| 180 | Cr | Weight % of Cr | PV and CV |
| 181 | Ni | Weight % of Ni | PV and CV |
| 182 | Zn | Weight % of Zn | PV and CV |
| 183 | Ti | Weight % of Ti | PV and CV |
| 184 | Ag | Weight % of Ag | PV and CV |
| 185 | B | Weight % of B | PV and CV |
| 186 | Bi | Weight % of Bi | PV and CV |
| 187 | Ga | Weight % of Ga | PV and CV |
| 188 | Li | Weight % of Li | PV and CV |
| 189 | Pb | Weight % of Pb | PV and CV |
| 190 | Sn | Weight % of Sn | PV and CV |
| 191 | V | Weight % of V | PV and CV |
| 192 | Zr | Weight % of Zr | PV and CV |
| 193 | Na | Weight % of Na | PV and CV |
| 194 | K | Weight % of K | PV and CV |
| 195 | Ca | Weight % of Ca | PV and CV |
| 196 | Special: | Weight % of another element unique to the alloy | PV and CV |
| | Environmental Records | Environmental parameters that affect casting that cannot be specifically controlled | |
| 197 | humidity | Relative humidity at the start of casting | PV and CV |
| 198 | barometric pressure | Barometric pressure at the start of casting | PV and CV |
| 199 | dew point | Dew point at the start of casting | PV and CV |
| 200 | air quality (particulate count) | Air quality index at the start of casting | PV and CV |
| 201 | light intensity | UV Index | PV and CV |
| | Water Chemistry Process Values | Representative values of water properties and chemistry, each value is most beneficial if gathered at cast start. | |
| 202 | M. Alkalinity | mg/L of alkali as $CaCO_3$ to resist acids above 4.4 pH | PV and CV |
| 203 | Chloride | mg/L of chloride ions present in the water | PV and CV |
| 204 | Conductivity | μmhos/cm or μS/cm that the water conducts electricity | PV and CV |
| 205 | Hardness | mg/L of Ca and Mg in the water | |

FIG. 8

Patent Parameter Summary Starting List

| Item | Common Process Inputs | Brief Explanation | What is measured? |
|---|---|---|---|
| ... | pH | Position on the pH scale determined by the negative log of Hydrogen ions. | PV and CV |
| | TSS | mg/L, Concentration of total suspended solids in the water. | PV and CV |
| | Turbidity | NTU, Relative clarity of the water measured in Nephelometric Turbidity Units. | PV and CV |
| | Free Halogen | mg/L, Sum of the free and combined chlorine, fluorine, and bromine residuals of the water. | PV and CV |
| | Oil and Grease | mg/L, Concentration of hydrocarbons in the water | PV and CV |
| | Calcium | mg/L, Concentration of calcium in the water | PV and CV |
| | Total Organic Carbon (TOC) | mg/L, Concentration of organic carbon in the water | PV and CV |
| | CaCo3 | mg/L, Concentration of $CaCO_3$ in the water | PV and CV |
| | Copper | mg/L, Concentration of Cu in the water | PV and CV |
| | Iron | mg/L, Concentration of Fe in the water | PV and CV |
| | HEM (Hexane Extractable Material) | mg/L, Concentration of materials that can be extracted with n-hexane which are non-volatile hydrocarbons such as oils and greases. | PV and CV |
| | Magnesium | mg/L, Concentration of Mg in the water | PV and CV |
| | Manganese | mg/L, Concentration of Mn in the water | PV and CV |
| | $NO_3/N$ | mg/L, Concentration of $NO_3/N$ in the water | PV and CV |
| | $PO_4/P$ | mg/L, Concentration of $PO_4/P$ in the water | PV and CV |
| | Silica | mg/L, Concentration of $SiO_2$ in the water | PV and CV |
| | Silicon | mg/L, Concentration of Si in the water | PV and CV |
| | Sodium | mg/L, Concentration of Na in the water | PV and CV |
| | TDS | mg/L, Concentration of Total Dissolved Solids in the water | PV and CV |
| | Sulfate | mg/L, Concentration of $SO_4^{2-}$ in the water | PV and CV |
| | Total P | mg/L, Concentration of Phosphorus in the water | PV and CV |
| | Zinc | mg/L, Concentration of Zn in the water | PV and CV |
| | F | mg/L, Concentration of Fluorine in the water | PV and CV |
| | $HCO_3^-$ (Bicarbonate ion) | mg/L, Concentration of bicarbonate ions in the water | PV and CV |
| | Mercury | mg/L, Concentration of Hg in the water | PV and CV |
| | Cadmium | mg/L, Concentration of Cd in the water | PV and CV |
| | Free Chlorine | mg/L, Concentration of chlorine ions in the water | PV and CV |
| | LSI (Langelier Saturation Index) | mg/L, Indicator of degree of saturation of water relative to calcium carbonate. | PV and CV |
| | Phosphonate | mg/L, Concentration of Phosphonate in the water | PV and CV |
| | Free Bromine | mg/L of Bromine that is not reacted in the water | PV and CV |

FIG. 9

Rolling Face

- Start at rim <2" – Nuisance Crack
  - 25) Level A (Moderate) - ≤2"
- Start at rim >2"≤12", width <3mm – start hot crack
  - 24) Level A (moderate) - ≤6"
  - 22) Level B (significant) - ≤9"
  - 16) Level C (severe) - ≤12"
- Start at rim >2"≤12", width ≥3mm, Drooping rolling face on either side of crack – Collapsed butt crack
  - 23) Level A (moderate) - ≤6"
  - 21) Level B (significant) - ≤12"
  - 15) Level C (severe) – full length
- Start ≥1/2" from rim – hot crack
  - 20) Level A (moderate) - ≤6"
  - 17) Level B (significant) - ≤12"
  - 13) Level C (severe) – full length
- Start 1" prior or 2" after valve opening – Transition valve crack
  - 19) Level A (moderate) - ≤3" long
  - 18) Level B (significant) - ≤6"
  - 14) Level C (severe) – full length
- Start at rim, >12" long, ≥3mm wide and 2xxx or 7xxx – Butt Cold Crack
  - 6) Level A (moderate) – within 15% of width to corner
  - 5) Level B (significant) – within 33% of width to corner
  - 4) Level C (severe) – In center to 33% of width
- Start after rim, >12" long, stops prior to head, and 2xxx or 7xxx – Transition Cold Crack
  - 12) Level A (moderate) – 12-<20" long
  - 11) Level B (significant) – 20-<40"of width to corner
  - 10) Level C (severe) – 40"- ∞
- Start after transition through head of ingot, >12" long, and 2xxx or 7xxx – Head Cold Crack
  - 3) Level A (moderate) – 12-<80" long
  - 2) Level B (significant) – 80--∞"long
  - 1) Level C (severe) – Drains ingot sump
- Start after transition >12" long, horizontal cracks off the main crack, and 2xxx or 7xxx – Herringbone Crack
  - 9) Level A (moderate) – 12-<20" long
  - 8) Level B (significant) – 20-<40"long
  - 7) Level C (severe) – 40"- ∞

FIG. 10

End Face

- Start at rim <2" – Nuisance Crack
    - 14) Level A (Moderate) - ≤2"
- Start at rim ≤12", width <3mm – start hot crack
    - 13) Level A (moderate) - ≤6"
    - 9) Level B (significant) - ≤9"
    - 8) Level C (severe) - ≤12"
- Start ≥1/2" from rim – hot crack
    - 12) Level A (moderate) - ≤6"
    - 7) Level B (significant) - ≤12"
    - 5) Level C (severe) – full length
- Start 1" prior or 2" after valve opening – Transition/valve crack
    - 6) Level B (significant) - ≤6"
    - 4) Level C (severe) – full length
- Start 1" prior or 2" after valve opening, horizontal rather than vertical – Horizontal Tears
    - 14) Level A (moderate) - ≤1mm wide
    - 11) Level B (significant) - ≤3mm wide
    - 10) Level C (severe) – Across entire thickness of at least one end (any opening width)
- Start ≥12" from rim, >12" long and 2xxx or 7xxx – End Cold Crack
    - 3) Level B (significant) - >12" – 100" long
    - 1) Level C (severe) – to head of ingot
- Start at rim, >10", 2xxx or 7xxx – End Butt Cold Crack
    - 2) Level C (severe) – up to half ingot length

FIG. 11

Rolling Face

- Start at rim <2" – Nuisance Crack –
    - 25) Level 1 (Moderate) - ≤2"
        - Curl height?
        - If curl < 30mm and no other defects? – no action.
        - If curl > 30mm and no other defects?
            - Check grain refiner inoculation
                - Was inoculation to troughs typical for this alloy and size combination?
                - If yes, proceed to next step.
                - If no, remind operators of proper trough inoculation.
            - Check grain refiner feed rate.
                - Was rod feeder feed rate as designated in practice?
                - If yes, proceed to next step.
                - If no, Fix rod feeder operation.
            - Check fill time (of identical, fill, pin presets, speed, and water parameters on successful casts)
                - If fill time matches median value proceed to next step.
                    - If fill time is slower than median value, suggest return to median value.
                    - If fill time is longer than median value, suggest return to median value.
            - Check start water and metal temperature of this cast against historical median data (of identical, fill, pin presets, speed, and water parameters on successful casts).
                - If water temperature is lower, suggest raising water temperature to the median value.
                - If water temperature is higher, suggest lowering temperature to the median value.
                - If metal temperature is lower, suggest raising temperature to the median value.
                - If metal temperature is higher, suggest lowering temperature to the median value.
                - If water and metal temperatures are at median values, proceed to next step.
            - Compare speed and water values to practice generator and how successful current parameters have been.
                - Start speed, start speed delay, start water, start water delay. If any are to the colder side of practice generator (lower speed, longer delay, higher start water (gpm/in), shorter start water or delay) provide suggestion to operator to make that change towards the practice generator values.
        - If curl > 30mm and other defects? – Address highest priority defect first. When solutions conflict, take higher priority solution.

FIG. 12

End Face

- Start at rim <2" – Nuisance Crack
  - 14) Level 1 (Moderate) - ≤2"
    - Curl height?
    - If curl < 30mm and no other defects? – no action.
    - If curl > 30mm and no other defects?
      - Check grain refiner inoculation
        - Was inoculation to troughs typical for this alloy and size combination?
        - If yes, proceed to next step.
        - If no, remind operators of proper trough inoculation.
      - Check grain refiner feed rate.
        - Was rod feeder feed rate as designated in practice?
        - If yes, proceed to next step.
        - If no, Fix rod feeder operation.
      - Check fill time
        - If fill time matches median value proceed to next step.
          - If fill time is slower than median value, suggest return to median value.
          - If fill time is longer than median value, suggest return to median value.
      - Check start water and metal temperature of this cast against historical median data.
        - If water temperature is lower, suggest raising water temperature to the median value.
        - If water temperature is higher, suggest lowering temperature to the median value.
        - If metal temperature is lower, suggest raising temperature to the median value.
        - If metal temperature is higher, suggest lowering temperature to the median value.
        - If water and metal temperatures are at median values, proceed to next step.
      - Compare speed and water values to practice generator,
        - Start speed, start speed delay, start water, start water delay. If any are to the colder side of practice generator (lower speed, longer delay, higher start water (gpm/in), shorter start water or delay) provide suggestion to operator to make that change towards the practice generator values.

- If curl > 30mm and other defects? – Address highest priority defect first. When solutions conflict, take higher priority solution.

FIG. 13

End Face

- Start at rim ≤12", width <3mm – start hot crack
  - 13) Level 1 (moderate) - ≤6"
    - Check grain refiner inoculation
      - Was inoculation to troughs typical for this alloy and size combination?
      - If yes, proceed to next step.
      - If no, remind operators of proper trough inoculation.
    - Check grain refiner feed rate.
      - Was rod feeder feed rate as designated in practice?
      - If yes, proceed to next step.
      - If no, Fix rod feeder operation.
    - Check fill time
      - If fill time matches median value proceed to next step.
        - If fill time is slower than median value, suggest return to median value.
        - If fill time is longer than median value, suggest return to median value.
    - Check steamline length
      - If rolling face steamline is within +-15mm of median value -
        - No action
      - If rolling face steamline is 15 or more mm lower than median
        - Check water and metal temperature to median value.
        - If water temperature and metal temperature are the same as median continue to next step.
          - If water temperature is lower, suggest raising water temperature to the median value.
          - If metal temperature is lower, suggest raising temperature to the median value.
        - Compare speed and water values to practice generator,
          - Start speed, start speed delay, start water, start water delay. If any are to the colder side of practice generator (slower start speed, longer speed delay, higher start water (gpm/in), or shorter start water delay) provide suggestion to operator to make that change towards the practice generator values.
        - If practice values are acceptable, check water chemistry values for changes to "lower quench".

*Continued in Figure 15*

FIG. 14

- If rolling face steamline is higher than the median by 15 or more mm then,
  - Check water and metal temperature to median value.
  - If water temperature and metal temperature are the same continue to next step.
    - If water temperature is higher, suggest lowering temperature to the median value.
    - If metal temperature is higher, suggest lowering temperature to the median value.
  - Compare speed and water values to practice generator,
    - Start speed, start speed delay, speed ramp rate, start water, start water delay, water ramp rate. If any are to the hotter side of practice generator (higher speed, shorter speed delay, higher speed ramp rate, lower start water (gpm/in), longer start water delay or shallower water ramp) provide suggestion to operator to make that change towards the practice generator values.
- If practice values are acceptable, check water chemistry values for changes to "increase quench".

▪ Is steamstain >150mm and other defects? – Address highest priority defect first. When solutions conflict, take higher priority solution.

- 9) Level 2 (significant) - ≤9"
  - Repeat Decision Tree
- 8) Level 3 (severe) - ≤12"
  - Repeat Decision Tree

FIG. 15

CONTINUOUS CASTING PARAMETER VALUE AND SET-UP CONDITION DETERMINATION USING ARTIFICIAL INTELLIGENCE

TECHNOLOGICAL FIELD

The present invention relates to a system, apparatus, and method for continuous casting of metal, and more particularly, to a system, apparatus, and method for the determination of parameter values for continuous casting of metal using machine learning and artificial intelligence to reduce or eliminate defects in the casting.

BACKGROUND

Metal products may be formed in a variety of ways; however numerous forming methods first require an ingot, billet, or other cast part that can serve as the raw material from which a metal end product can be manufactured, such as through rolling or machining, for example. One method of manufacturing an ingot or billet is through a continuous casting process known as direct chill casting, whereby a vertically oriented mold cavity is situated above a platform that translates vertically down a casting pit. A starting block may be situated on the platform and form a bottom of the mold cavity, at least initially, to begin the casting process. Molten metal is poured into the mold cavity whereupon the molten metal cools, typically using a cooling fluid. The platform with the starting block thereon may descend into the casting pit at a predefined speed to allow the metal exiting the mold cavity and descending with the starting block to solidify. The platform continues to be lowered as more molten metal enters the mold cavity, and solid metal exits the mold cavity. This continuous casting process allows metal ingots and billets to be formed according to the profile of the mold cavity and having a length limited only by the casting pit depth and the hydraulically actuated platform moving therein.

The continuous casting process involves hundreds of variables that impact quality of the resultant casting. Variables such as metal temperature, metal chemistry, cooling water temperature, flow rates, casting speed, and water chemistry, among numerous other variables can dramatically affect the quality of a casting. Optimizing parameter values for continuous casting is necessary to reduce and potentially eliminate defects in the casting. Such parameter value determination is challenging.

BRIEF SUMMARY

The present invention relates to a system, apparatus, and method for continuous casting of metal, and more particularly, to a system, apparatus, and method for determining parameter values for continuous casting of metal using artificial intelligence to reduce or eliminate defects in the casting. Embodiments provide a method of parameter value determination for direct chill casting including: obtaining at least one image of a surface of a casting that has been cast with a first set of casting parameter values and set-up conditions, where the at least one image of the surface of the casting includes at least one casting anomaly; processing the at least one image of the surface of the casting through a first machine learning model as an input; receiving, from the first machine learning model and a classifier, at least one classification as an output, where the at least one classification comprises at least one casting anomaly classification; Alternatively, directly inputting a casting anomaly classification or classifications and processing the at least one classification as an input to a second machine learning model; and receiving, from the second machine learning model, an indication of at least one of casting parameter value changes or set-up condition changes to be made to the first set of casting parameter values or set-up conditions to arrive at a second set of casting parameter values and set-up conditions, where the second set of casting parameter values and set-up conditions are intended to reduce or eliminate the at least one casting anomaly.

According to some embodiments, the first machine learning model is a deep neural network. The first machine learning model of an example embodiment is a classification engine. According to some embodiments, the at least one casting anomaly comprises one or more of: butt curl, cold folding, cracking, oxide patches, tears, folds, lap lines, liquation, surface pimples, surface blisters, profile, steam stains, spiraling, or bleed out/over. The first set of casting parameter values of some embodiments include values for one or more of: casting material temperature, casting material chemistry, water temperature, water chemistry, start water flow rate, water ramp rate, run water flow rate, casting start speed, speed delay, speed ramp and run speed, processing equipment preheat temperatures, metal level, metal level ramping, fill rate, pin position, or casting gas flow rate.

According to some embodiments, the method includes receiving, from the first machine learning model, at least one classification as an output where the at least one classification includes at least one casting anomaly classification and at least one corresponding size measurement and cast length location of the at least one surface anomaly. According to certain embodiments, the input further includes an indication of a size of the at least one casting anomaly.

Embodiments provided herein include a method of parameter value determination for direct chill casting including: receiving data corresponding to a casting defect of a casting that has been cast with a first set of casting parameter values; determining, from the data, at least one classification as an output, where the at least one classification includes at least one casting defect classification; processing the at least one classification as an input to a second machine learning model; and receiving, from the second machine learning model, an indication of casting parameter value changes to be made to the first set of casting parameter values to arrive at a second set of casting parameter values, where the second set of casting parameter values are intended to reduce or eliminate the at least one casting anomaly. According to some embodiments, determining, from the data, the at least one classification as the output includes determining, using a first machine learning model, the at least one classification as the output.

According to some embodiments, processing the at least one classification as the input to the machine learning model further includes processing the at least one classification along with the first set of casting parameter values as the input to the second machine learning model. The data of some embodiments includes at least one of image data or non-destructive analysis data. According to certain embodiments, the non-destructive analysis data is collected using one or more of photographs, laser profile testing, photogrammetry, linear displacement testing, Eddy Current testing, Magnetic Testing, Thermographic Testing, Resonant Testing, Radiographic Testing, or Ultrasonic Testing. According to certain embodiments, the at least one classification further includes a priority of the at least one casting defect and a severity of the at least one casting defect.

According to certain embodiments, the first machine learning model is a classification engine.

Embodiments provided herein include an apparatus including at least one processor and at least one memory including computer program code, the at least one memory and the computer program code configured to, with the processor, cause the apparatus to at least: receive data corresponding to a casting defect of a casting that has been cast with a first set of casting parameter values; process the data as input to a first machine learning model; receive, from the first machine learning model, at least one classification as an output, where the at least one classification includes at least one casting defect classification; process the at least one classification as an input to a second machine learning model; and receive, from the second machine learning model, an indication of casting parameter value changes to be made to the first set of casting parameter values to arrive at a second set of casting parameter values, where the second set of casting parameter values are intended to reduce or eliminate the at least one casting defect.

According to some embodiments, causing the apparatus to process the at least one classification as the input to the second machine learning model further includes causing the apparatus to process the at least one classification along with the first set of casting parameter values as the input to the second machine learning model. According to some embodiments, the at least one classification includes a priority and a severity of the at least one defect. The priority and the severity of the at least one defect include measures determined based, at least in part, on a position and a size of the at least one defect.

BRIEF DESCRIPTION OF THE DRAWINGS

Figure 1:
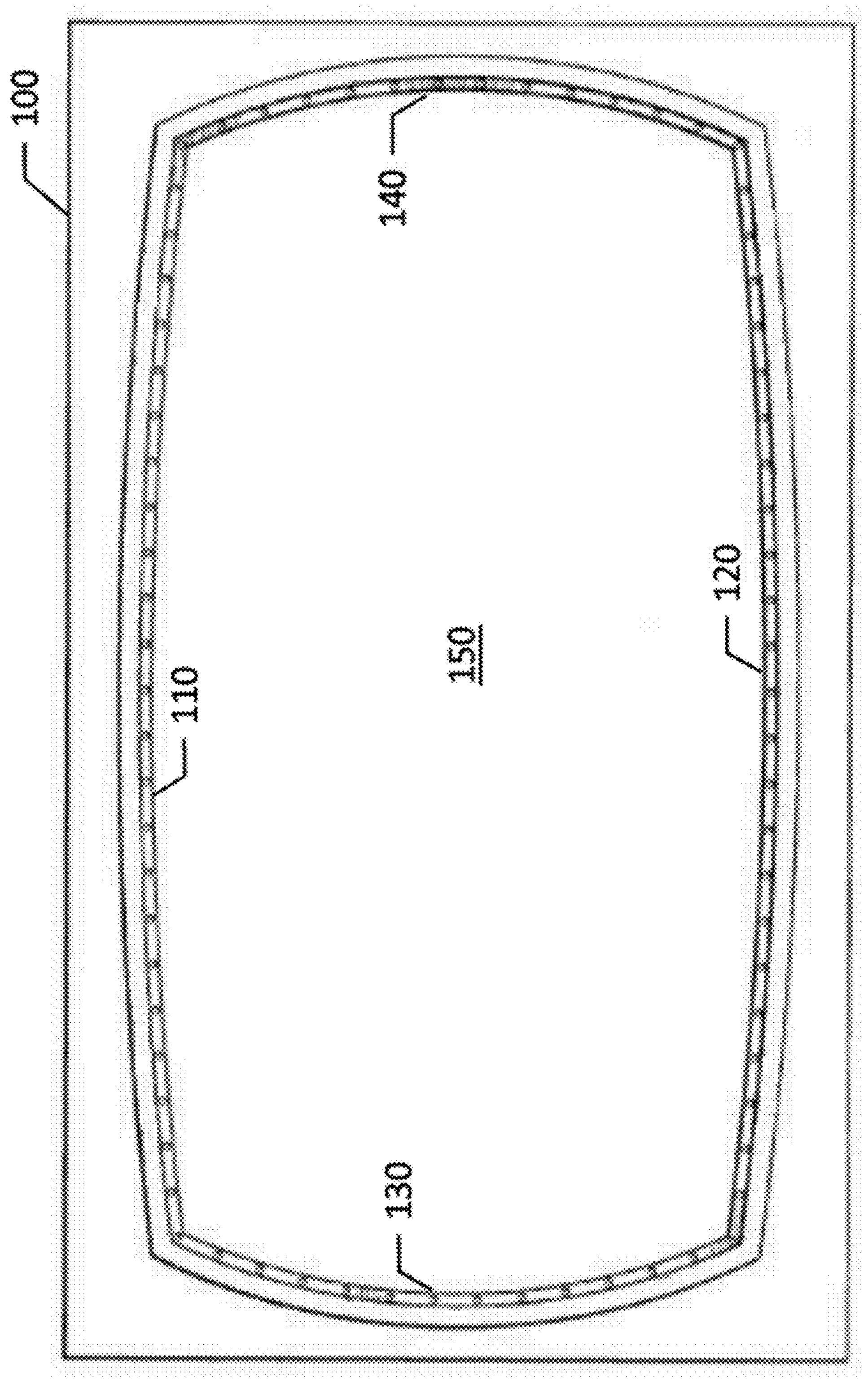
Figure 2:
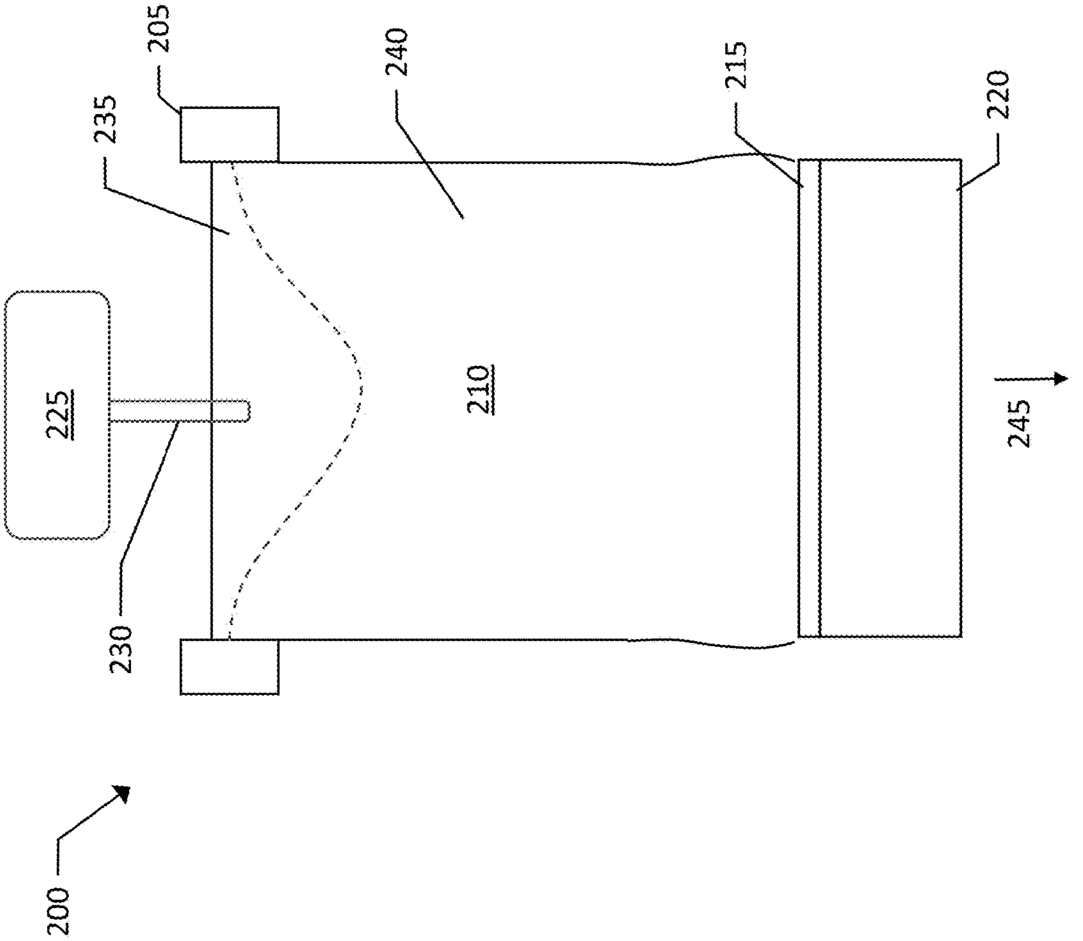
Figure 16:
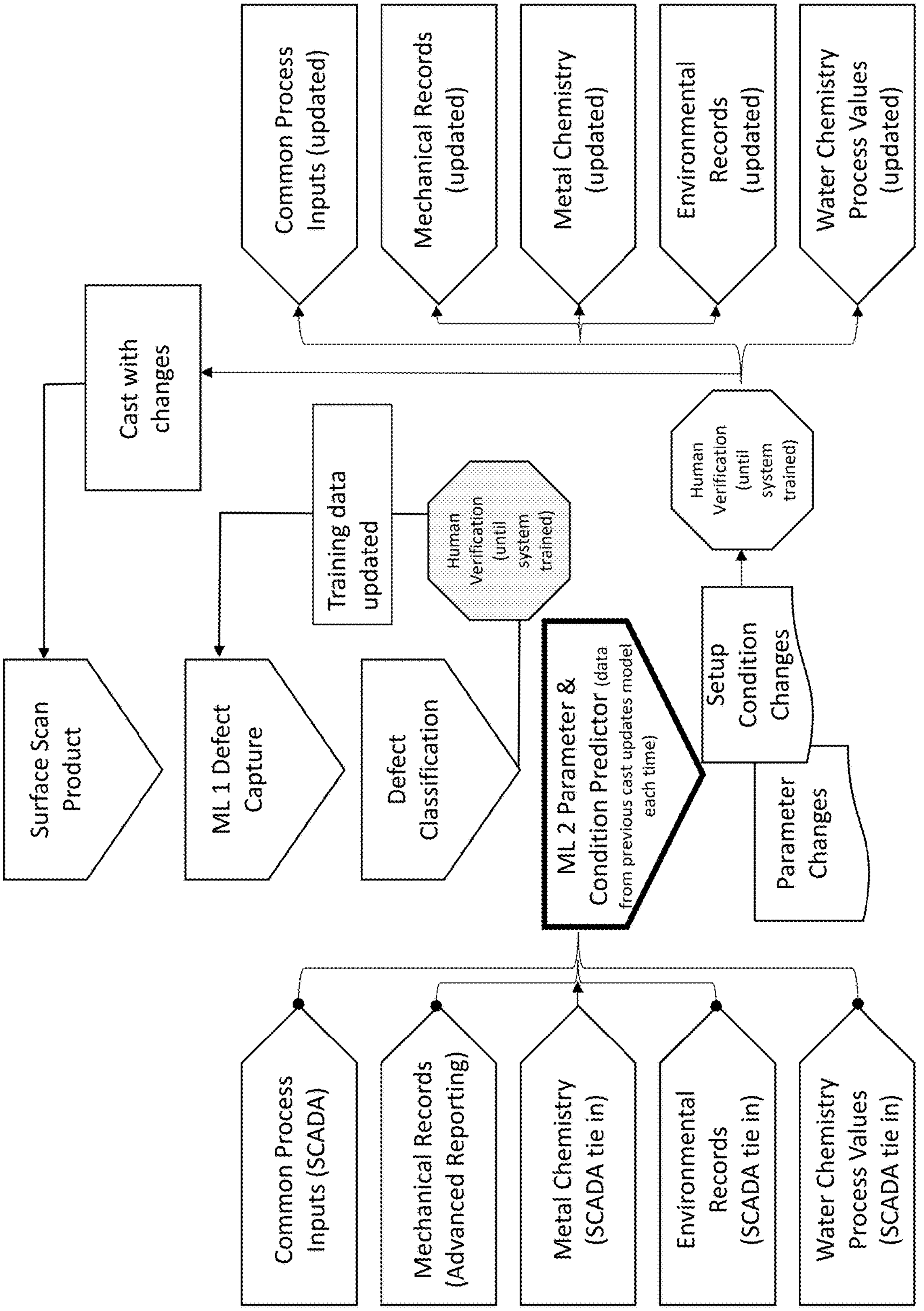
Figure 17:
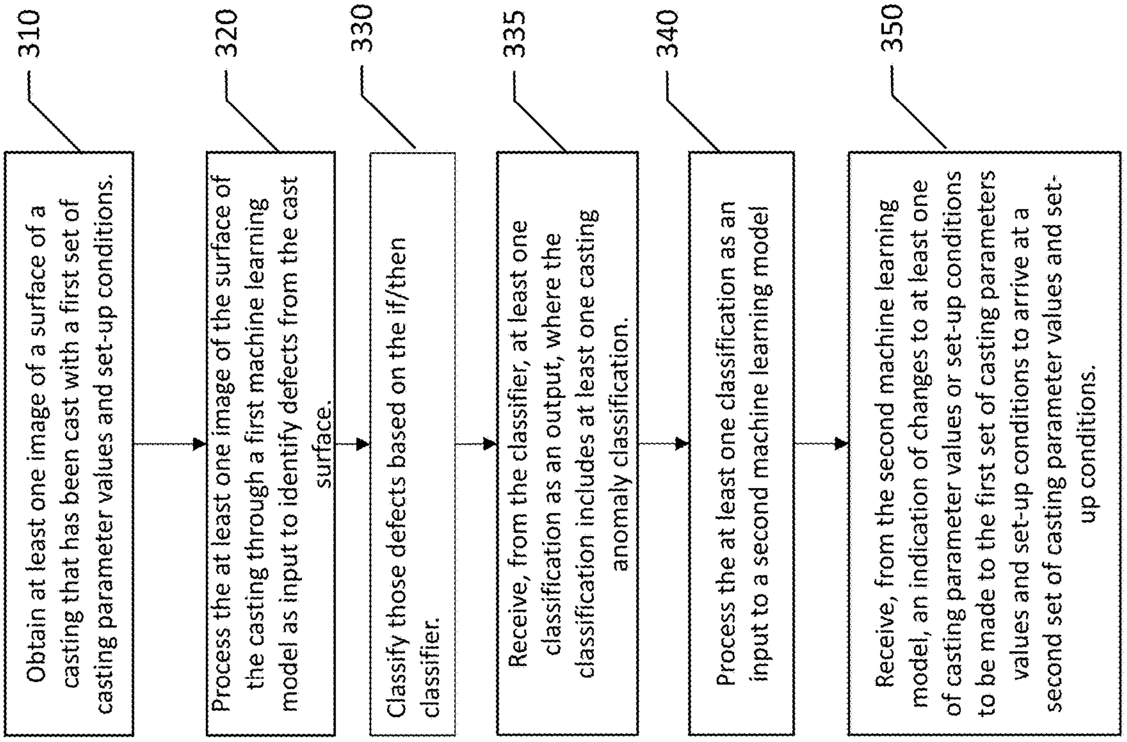
Figure 18:
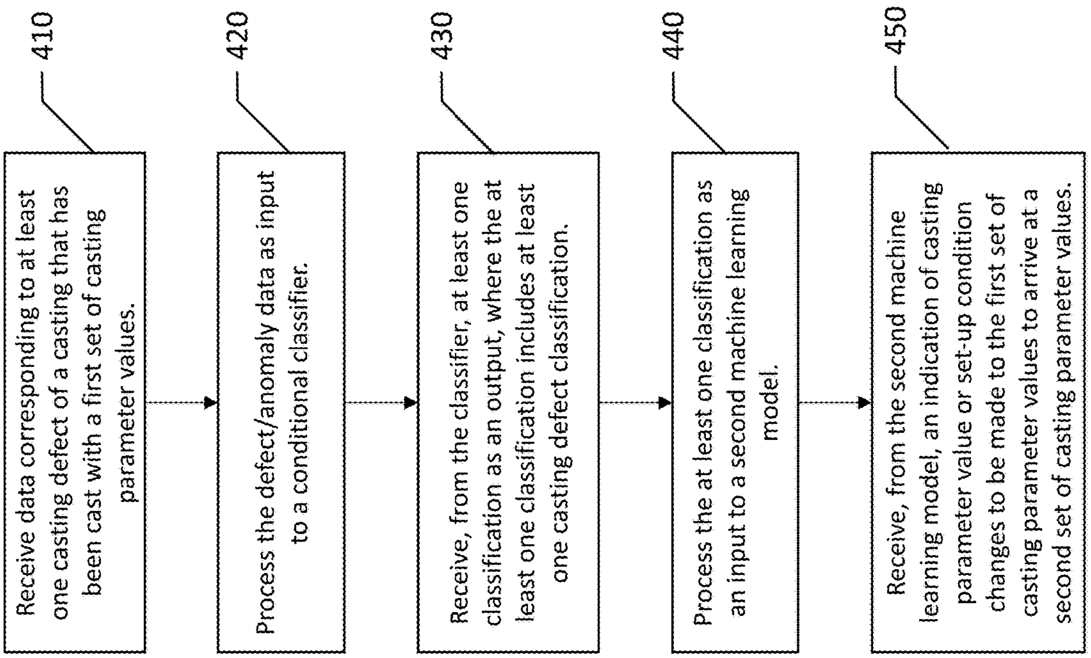
Figure 19:
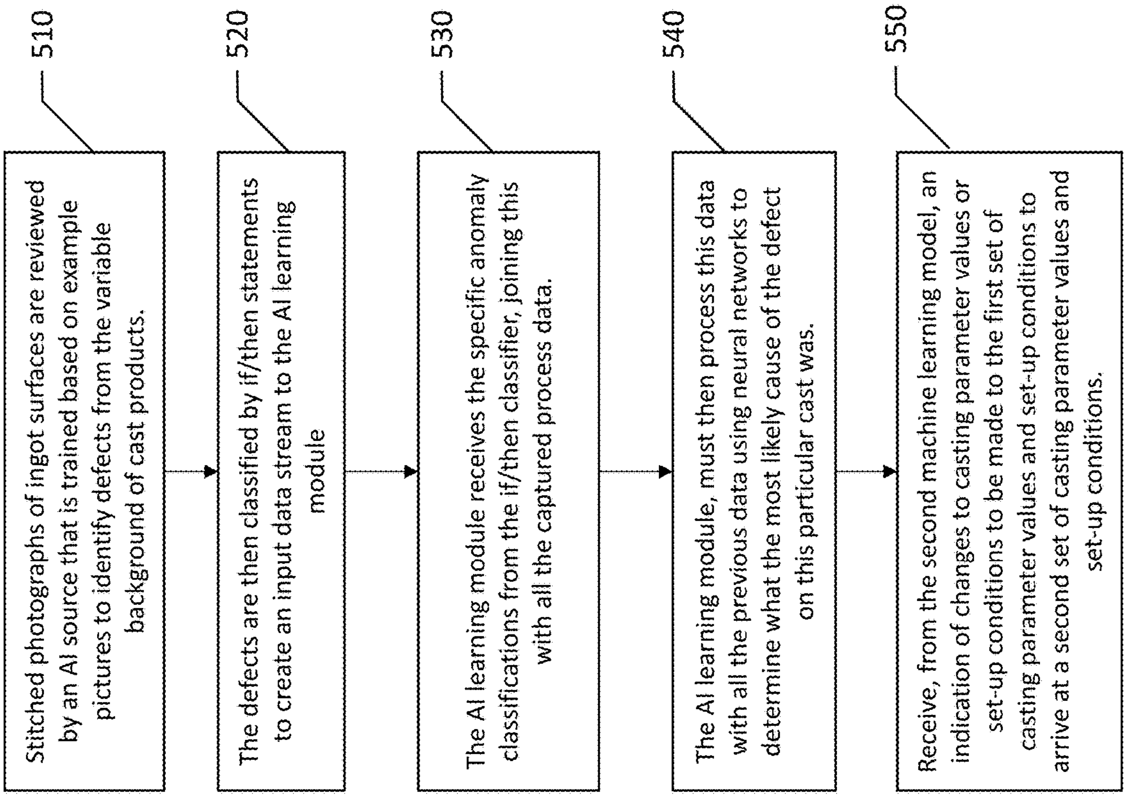
Figure 20:
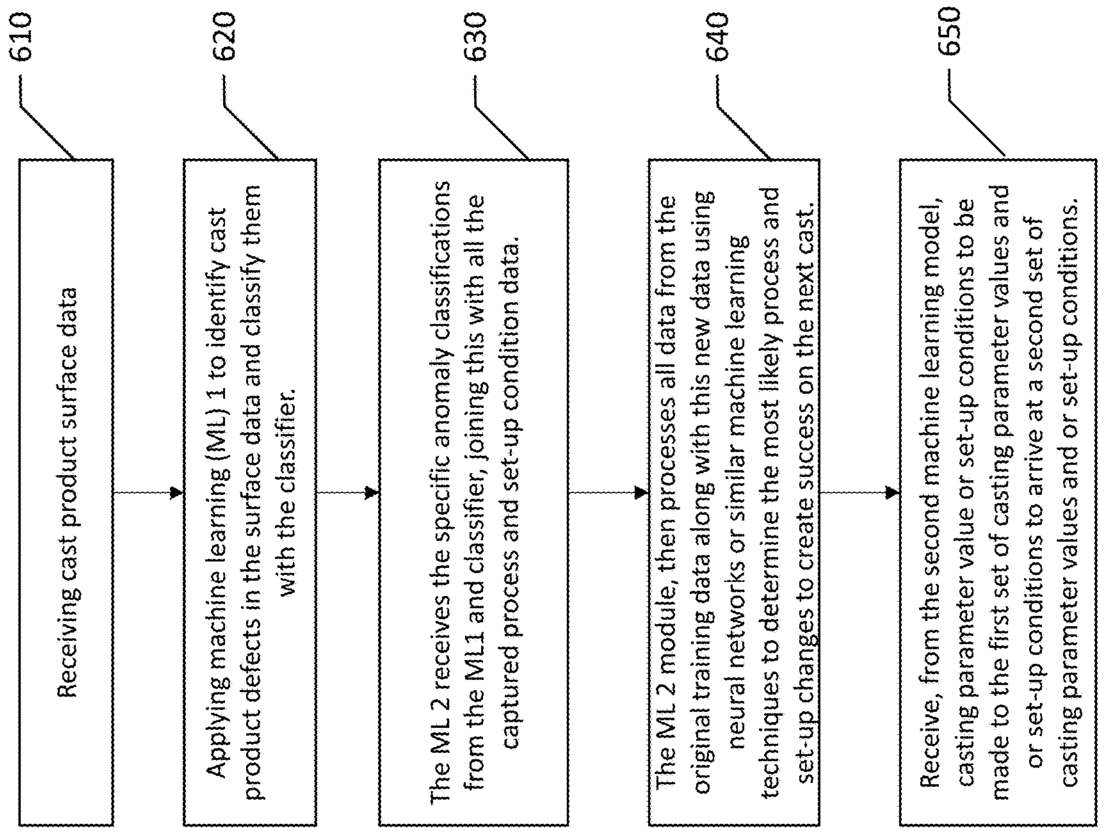

Having thus described the invention in general terms, reference will now be made to the accompanying drawings, which are not necessarily drawn to scale, and wherein:

FIG. 1 illustrates an example embodiment of a conventional direct chill casting mold which would be received within a table or frame assembly of a direct chill casting system according to an example embodiment of the present disclosure;

FIG. 2 depicts a general illustration of a cross-section of a direct chill casting mold during the casting process according to an example embodiment of the present disclosure;

FIGS. 3-9 illustrate a non-exhaustive table of casting parameters and set-up conditions that include various aspects of the casting process that can be adjusted during a casting operation;

FIG. 10 illustrates an example listing of crack priorities and severities based on a position of the crack, a length of the crack, and a type of alloy cast according to an example embodiment of the present disclosure;

FIG. 11 illustrates a similar list of end face cracks with a position, a priority, and a level of severity according to an example embodiment of the present disclosure;

FIG. 12 depicts an iterative technique to identify probable conditions that caused a defect, and to recommend parameter value determination to mitigate the defect going forward according to an example embodiment of the present disclosure;

FIG. 13 illustrates a technique for addressing a nuisance crack starting at the rim of less than two inches according to an example embodiment of the present disclosure;

FIGS. 14 and 15 illustrate a technique for addressing a start hot crack starting at the rim that is less than 12-inches long and less than 3 mm wide according to an example embodiment of the present disclosure;

FIG. 16 illustrates major process summary blocks that feed into a second machine learning model according to an example embodiment of the present disclosure;

FIG. 17 illustrates a process for continuous casting parameter value and set-up condition determination using artificial intelligence according to an example embodiment of the present disclosure;

FIG. 18 illustrates another process for continuous casting parameter value and set-up condition determination using artificial intelligence according to an example embodiment of the present disclosure;

FIG. 19 illustrates a further process for continuous casting parameter value and set-up condition determination using artificial intelligence according to an example embodiment of the present disclosure; and FIG. 20 illustrates a still further process for continuous casting parameter value and set-up condition determination using artificial intelligence according to an example embodiment of the present disclosure.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention generally relate to the process of continuous casting of a direct chill casting mold to facilitate a more consistent ingot and/or billet. Vertical direct chill casting is a process used to produce ingots or billets that may have large cross sections for use in a variety of manufacturing applications. The process of vertical direct chill casting begins with a horizontal table containing one or more vertically oriented mold cavities disposed therein. Each of the mold cavities is initially closed at the bottom with a starting block or starting plug to seal the bottom of the mold cavity. Molten metal is introduced to each mold cavity through a metal distribution system to fill the mold cavities. As the molten metal proximate the bottom of the mold, adjacent to the starting block solidifies, the starting block is moved vertically downward along a linear path. The movement of the starting block may be caused by a hydraulically lowered platform to which the starting block is attached. The movement of the starting block vertically downward draws the solidified metal from the mold cavity while additional molten metal is introduced into the mold cavities. Once started, this process moves at a relatively steady state for a semi-continuous casting process that forms a metal ingot having a profile defined by the mold cavity, and a height defined by the depth to which the platform and starting block are moved.

During the casting process, the casting and the mold itself is cooled to encourage solidification of the metal prior to the metal exiting the mold cavity as the starting block is advanced downwardly, and a cooling fluid is introduced to the surface of the metal proximate the exit of the mold cavity as the metal is cast to draw heat from the cast metal ingot and to solidify the molten metal within the now-solidified shell of the ingot. As the starting block is advanced downward, the cooling fluid may be sprayed directly on the ingot to cool the surface and to draw heat from within the core of the ingot.

The direct chill casting process enables ingots to be cast of a wide variety of sizes and lengths, along with varying profile shapes. While circular billet and rectangular ingot are most common, other profile shapes are possible. Circular profile billets benefit from a uniform shape, where the distance from the external surface around the billet to the core is equivalent around the perimeter. However, rectangular or variable periphery ingots lack this uniformity of surface-to-core depth and thus have additional challenges to consider during the direct chill casting process.

Various complexities exist in the casting of metal parts, particularly in vertical direct chill continuous casting. There are well over 100 individual inputs or casting parameter values that impact the outcome of a continuous casting operation, with the potential for substantially more inputs particularly employing embodiments described herein which can better handle adjustment of inputs to improve the quality of a casting.

Currently, while casting (or shortly after the cast is finished), the cast billet or ingot is visually observed or inspected. If a defect is noticed, a manual process of defect identification and troubleshooting begins using information contained in defect guides that correlate defects with various causes. This process is laborious and arduous, particularly in view of how the various individual casting parameters impact the casting quality and the interaction between various parameters that can resolve one issue while causing another. Process improvement to overcome the defects being produced is generally a stepwise process. The most likely responsible casting parameter may be adjusted first. If that adjustment does not solve the problem, the next likely variable is manipulated, and so on. Because this process is done manually, it can take significant time to arrive at a solution. Further, it is generally not even possible to only change one variable at a time which means that a change to one casting parameter that affects another casting parameter renders the improvement or decline in quality of the casting difficult to pin down to a specific cause. Further, as it takes time to produce casting and record defect information, correlation back to a specific casting parameter can be challenging.

Embodiments described herein improve upon the manual process by implementing an automated parameter value determination process by using defect analysis and parameter value determination tools. The collected defect information, together with the casting parameters associated with the cast are analyzed to correlate specific defects with process and other influencing casting parameter values. As the database of information grows in the form of training data for a machine learning model, the machine learning model will learn and become more efficient and effective in predicting defects, allowing for process improvements much earlier in the process.

Embodiments of the present disclosure collect the inputs or casting parameter values for a casting operation and then apply multiple techniques to the input values to categorize, prioritize, and relate the individual input values to specific internal and external casting defects. These correlations are then analyzed by artificial intelligence (AI) through machine learning to determine improvements to the existing techniques, providing for adjustment to improve all quality measures of the cast product including process timing determination. The as-cast product is analyzed, attributes collected, and defects identified. Techniques then use the identified defect and ingot/billet attributes to classify the defect by name, priority, severity, and magnitude to provide recommended process, casting practice, chemical, and equipment control changes to any one or combination of the 150-plus identified casting parameter inputs in one example embodiment.

The machine learning models as described herein can be implemented on a computer implementing a processor to apply the machine learning models and techniques thereof. The machine learning models can access training data and learned data stored, for example, on a memory device. Embodiments described herein can thus be implemented on a non-transitory-readable medium storing computer with executable program code instructions to execute the machine learning models described herein.

A direct chill casting mold to produce an ingot with a rectangular profile does not have a perfectly rectangular mold cavity due to the deformation of the ingot as it cools after leaving the mold cavity. The portion of the ingot exiting the mold cavity as the platform and the starting block descend, retains a molten or at least partially molten core inside the solidified shell. As the core cools and solidifies, the external profile of the ingot changes such that the mold cavity profile, while it defines the shape of the final, cooled ingot, does not have a shape or profile that is identical to the final, cooled ingot.

FIG. 1 is an example embodiment of a conventional direct chill casting mold 100 which would be received within a table or frame assembly of a direct chill casting system. As shown, the mold 100 includes first 110 and second 120 opposing side walls extending between first 130 and second 140 end walls of the mold cavity. The first and second opposing side walls 110, 120 and the first and second end walls 130, 140, combine to form the mold cavity 150 having a generally rectangular profile. The first and second opposing side walls 110, 120, have an arcuate shape, or at least some degree of curvature to the wall profile. This shape enables the cast ingot to have substantially flat opposing sides during a steady-state casting operation of the direct chill casting process. The end walls 130 and 140 may also have a specified shape, which may include a curvature, a series of flat sides arranged in an arcuate shape, a compound curvature, or a straight side, for example. The "steady state" portion of the casting process, as described herein, is the portion of the casting process after the initial start-up phase or start up casting phase and before the end of the casting process or ending casting phase. Steady-state casting occurs when the temperature profile in the portion of the ingot exiting the mold cavity remains constant or near constant. Different casting control parameters may be desired at each phase of the casting from starting phase, to steady-state phase, to ending phase based on the type of material being cast.

Direct chill casting molds, such as molds produced by Wagstaff, Inc. of Spokane Valley, Washington, can include mold walls that have variable shape profiles. Such variable shape profiles enable the mold cavity to have a profile that changes based on a phase of a casting process, which can reduce waste by producing ingots that have a substantially uniform profile along their entire length. The mold sidewall shapes and dynamic changes thereto provide additional inputs that can be leveraged by techniques noted above in mitigating defects and improving the overall quality of a casting as described herein.

FIG. 2 depicts a general illustration of a cross-section of a direct chill casting mold 200 during the casting process. The illustrated mold could be for a billet or an ingot, for example. As shown, the mold walls 205 form a mold cavity from which the cast part 210 is formed. The casting process begins with the starter block 215 sealing the bottom of the mold cavity against mold walls 205. As the platform 220 moves down along arrow 245 into a casting pit and the cast part begins to solidify at its edges within the mold walls 205, the cast part 210 exits the mold cavity. Metal flows from a pouring trough 225, which may be a heated reservoir or a reservoir fed from a furnace, for example, through spout 230 into the mold cavity. As shown, the spout 230 is partially submerged within a molten pool of metal 235 to avoid oxidation of metal that would occur if fed from above the molten metal pool 235. According to some embodiments, the spout may be surrounded by a metal distribution bag which provides directed metal flow into the mold, and a skim dam that is positioned outside of the spout and metal distribution bag to capture oxide before it rolls onto the mold face. The solidified metal 240 constitutes the formed cast part, such as an ingot. Flow through the spout 230 is controlled within the pouring trough 225, such as by a tapered plug fitting within an orifice of 230 connecting a cavity of the pouring trough 225 with a flow channel through the spout 230. Conventionally, the pouring trough 225, spout 230, and mold cavity/mold walls 205 are held in a fixed relationship from the beginning of the casting operation through the end of the casting operation. Though it can be such that mold 205 is moved closer to or further from the spout 230 to improve spout penetration of the liquid metal 235 at varying levels of liquid metal inside mold 205. Flow of metal through the spout 230 continues as the platform 220 continues to descend along arrow 245 into the casting pit. When the casting operation is to end, either by the platform being at the bottom of its travel, the metal supply running low, or the cast part reaching the completed size, the flow of metal through the spout 230 stops, and the spout assembled on the trough is removed from the molten pool of metal 235 to allow the molten pool to solidify and complete the cast part.

The various aspects of the direct chill casting process, such as the speed of descent of the starter block 215, the flow rate of molten metal through the spout 230, the temperature profile of the molten metal at various stages along the flow path into the casting, the temperature, chemistry, and flow-rate of cooling fluid sprayed on an external surface of the casting, the temperature profile of the mold walls 205, the casting chemistry, and numerous other inputs all have an impact on quality of the cast product. Thus, all of these variable inputs can be tuned to produce the highest quality cast product.

Defects of a continuous casting cast product can be of a wide variety of types and severities. One example of a defect is a surface crack. The detectability of a surface crack is substantially greater than internal cracks. Internal cracking may be detected through a variety of testing processes, such as Eddy Current testing, Magnetic Testing, or Thermographic Testing for near-surface defects, or Resonant Testing, Radiographic Testing, Ultrasonic Testing, or the like for defects further from a surface of the casting. Other defects, such as butt swell, surface bubbling, surface ripples, tears, folds (vertical and cold), bleed-out/over, cold folding, lap lines, liquation, surface pimples, surface blisters, spiraling, distorted profile, cooling rings, water stains, metal tags, etc. can be identified often through surface analysis, though sometimes require microscopic analysis of the surface.

Currently, while casting or shortly after the cast is finished, the cast billet/ingot can be visually observed or inspected. This inspection process can include surface analysis using the naked eye, or some magnification apparatus to observe finer details of the surface. The inspection can also include an inspection of an internal cross-section of the casting, where the casting can be cut to expose parts of the casting not visible from the outside of a complete casting. Further, inspection can include the testing processes described above that can include non-destructive analysis of the internal structure of the casting. If a defect is noticed, a manual process of defect identification and troubleshooting begins. This can be a laborious and arduous process. Improvements in the process to overcome defects is generally a step wise process. The most likely variable may be adjusted first, and if the problem is not solved, the next likely variable is manipulated, and so on. As this process is done manually, it can take numerous iterations and substantial time to reach a solution. Further, it is generally not possible to only change one variable at a time, which means that if one parameter value is changed, some other parameter values are also changed, and it is unclear what actually solved the problem. Further, because of the time it takes to record defect information and then go back and try to correlate the defect with process variables that may have caused the problem, the time required to make this determination may be too long for it to be worth attempting.

Embodiments described herein employ machine learning and artificial intelligence to monitor for defects, analyze the defects, and determine solutions to mitigate the defects. Embodiments employ sensors and software used for defect analysis, then implement additional sensor technology for continuous process parameter measuring and recording. Together this data is analyzed using analytical techniques that correlate defects with process parameters and their respective values along with other influencing parameters. As the database of information concerning defects and resolutions grows, the machine learning model of example embodiments will learn and become more efficient and effective in predicting failures allowing for process improvements much sooner in the process and in a shorter amount of time, with the goal being to process corrections before a significant defect occurs.

Described herein are a number of defects for cast products and a number of inputs that can be used to adjust the casting operation. However, these defects and inputs are not exhaustive, and other defects and inputs can be used without deviating from the scope of this disclosure. By collecting and analyzing the data automatically, the process of collecting and analyzing data will become more efficient and effective. Employing software techniques described herein on the collected data enable a more though analysis showing the interdependencies and interactions of the input variables.

Identification of defects in a casting through analysis of collected data can be performed in a variety of ways. Image analysis for external surface defects can be performed to identify issues that are visible on the external surface of the casting. Image analysis can also be performed in an analysis of a cross-section of the casting; however, requiring the casting to be cut to obtain a visible cross-section surface which is not practical for normal production. Non-destructive analysis can be performed using Eddy Current testing, Magnetic Testing, or Thermographic Testing for near-surface defects, or Resonant Testing, Radiographic Testing, Ultrasonic Testing, or the like. These types of analysis are referred to as "non-destructive" as they do not require the casting to be cut, segmented, or otherwise compromised for purposes of the analysis.

In order to identify defects in a casting through image and non-destructive testing analysis, defects need to be identified in a set of training data. This training data can include identification of a defect that is confirmed through a manual review process. Images and non-destructive test data can be analyzed, via manual user review or by image/data analysis tools. In manual review, a human operator can identify defects and classify the defects according to a defect or an anomaly classification. For image/data analysis tools, defects can be identified within the images or data, and presented to a human operator for review. The human operator can confirm or reject the identified defect. Further, the image/data analysis tool can attempt to classify the defect with an anomaly classification. This may be performed by a machine learning model; however, in order to establish sufficient training data, this training data may be a supervised machine learning model, whereby the identification and classification of defects is reviewed and confirmed/rejected by a human operator. This process can establish a corpus of training data from which defects can be properly identified and classified without requiring a human operator. Further, as a machine learning model receives input data for processing by the machine learning model, this data can be added to the training data corpus to better refine the data and image analysis process and improve the accuracy and repeatability of the defect identification and classification.

Upon identification and classification of defects through artificial intelligence employing the trained defect detection machine learning model, the defect can be used as an input to a second machine learning model, whereby the second machine learning model uses the defect to determine how to adjust casting operating parameter values to mitigate or eliminate the defect.

The second machine learning model requires initial training to correlate certain operational parameters with specific defects. This training can occur using supervised machine learning where techniques are initially identified that correlate defects with operating parameter value adjustments to remedy the defects. A human operator can confirm output of the supervised machine learning model to build a corpus of training data that is known to be valid.

According to an example embodiment, a casting pit operational and control architecture can employ at least twelve key variables: speed practice (start speed, start speed delay, speed ramp rate, stop speed), water practice (start water, start water delay, water ramp rate, run water flow rate), metal level practice (start metal level, steady state metal level, and all ramps between metal levels), fill rate (for each position), pin opening (for each position), cast water temperature, cast water properties (alkalinity, turbidity, conductivity, pH, etc.) casting launder hot and cold end temperature among other potential parameters.

Speed practice relates to the speed of a starting head descending into a casting pit. The casting head movement within a casting pit generally has a speed profile, whereby the starting head starts in a static position, and ramps up to a starting speed for a predetermined time or distance of travel. The starting head achieves a steady state speed during the casting operation, and then ramps down in speed at an end of a casting to again achieve a static position when casting is complete. The start speed, start speed delay, speed ramp rates, run speed, etc. all contribute to properties of the cast ingot or billet.

The water practice relates to the parameters surrounding the introduction of water through the mold to the casting. The water practice can include start water, where the starting time, temperature, flow rate can be identified. The start water delay can include a delay or maintaining of start water flow rate until water ramping begins. The water ramp rate can include a ramp rate of flow rate of the water at the casting and at an end of the casting operation. The run water can include a flow rate of the water during steady state operation of the casting process. Water temperature is critical throughout the cast. Some other water parameters that impact the casting operation include the cast water alkalinity, cast water turbidity, cast water conductivity, and the cast water pH as well as others.

The metal level practice relates to the molten metal level within the continuous casting mold. The metal level is generally controlled to a specific value but can be affected by speed of descent of the starting head, defects such as flashing, bleed-outs, bleed-overs, or hang-ups all of which impact the flow rate of metal into the continuous casting mold. In modern casthouses, there is typically a metal level practice with a starting metal level at the beginning of the casting operation, a steady state metal level during the casting operation, and ramps between the different metal levels within the continuous casting mold. The fill rate of the continuous casting mold determines the metal level of the mold prior to the platform 220 starting down. Total metal flow rate after start down is determined based upon the speed of descent of the starting head and the metal level to be achieved. The pin opening is the pin within the spout, whereby the pin opening affects the flow rate of metal through the spout into the continuous casting mold. The cast launder hot and cold temperatures relate to the launders that carry molten metal ahead of reaching the continuous casting mold. These can be heated to achieve a temperature that helps maintain the molten metal at a specific temperature ahead of casting.

In addition to the above-identified parameters, numerous other variables impact the outcome of a casting operation. According to embodiments described herein, techniques of the machine learning model classify each defect according to priority, severity, and magnitude to provide recommended process, casting practice, chemical, and equipment control changes to any one or a combination of the parameters and parameter values of the casting operation.

The machine learning models provided herein include the defect identification/classification model, and the parameter value determination model. The defect identification/classification model uses as input, images of the casting surface and data from the non-destructive testing methods to identify defects and classify them according to their defect type, priority, severity, and magnitude as the output of the model. The parameter value determination model uses as inputs the output of the identification/classification model for a casting operation. The parameter value determination model, based on the defect type, priority, severity, and magnitude along with the casting parameters associated with the ingot or billet from which the defects were identified outputs recommended process, casting practice, chemical, and equipment control changes for the casting operation. Between these two models, the casting operation is improved upon. The improvements may, in some embodiments, be iterative, particularly as the parameter value determination model learns from the improvements to the casting parameter values.

Casting parameters and set-up conditions, as described herein, can include various aspects of the casting process that can be adjusted based on a variety of conditions. Casting parameters and set-up conditions can include items in the tables of FIGS. 3-9; however, this is not an exhaustive list and not all values apply to all casting technologies.

The defect detection/classification model can collect attributes relating to the casting to inform the techniques used to classify the defects. These attributes can include an abort length at which point the casting was aborted, a casting length of the overall casting, a butt crop length of a distance from the start of the casting for cropping of the butt, scalp depth from the top of the casting, grain size of the metal grains, secondary dendrite arm spacing, shell zone, macrosegregation levels, surface micro-segregation levels, steamlines and shapes, steamstains and shapes, as well as corner butt curl. Secondary dendrite arm spacing (SDAS) is a parameter for the determination of local quench rate of a casting. The shell zone is a relatively thin band of elemental segregation near the surface of the casting caused by differing solidification rates. Macrosegregation is the elemental segregation from surface to center of a casting. Microsegregation occurs when solute concentration is not constant through the casting.

Defects in the casting can include defects such as large grains, large micro-segregation above a predetermined limit, large dendrite arm spacing, macrosegregation above a predetermined limit, steamlines above or below a predetermined limit, corner butt curl above or below a predefined limit, any cracks, bleed-out, bleed-over, flash, tear, drag, exudate, cold fold, edge, or corner lift, for example.

The geometrical features of a casting can be captured and analyzed relative to an ideal standard, such that the geometrical features can be deemed as defects if not maintained at the ideal standard or within a predetermined degree of accuracy. The parameter value determination model may use, as input, the geometrical features to identify parameter values for determination. Geometrical features can include thickness, width, length, profile, twist, lateral bow, longitudinal bow, butt curl, and butt and head shape scans for a cast ingot or billet. This information can be achieved through vision or laser measuring and cataloging to capture data and provide geometrical feature data back to the parameter value determination model to identify how certain parameter values impacted the geometrical features of a casting.

According to embodiments described herein, the defect identification/classification model can include various modules within the model to address specific types of defects. For example, a crack may be readily discernable from the image analysis or data analysis from the non-destructive testing. The cracking technique module can sort and grade cracks. The position of the cracks on the casting is also informative of the defect type and how it may be remedied in the parameter value determination model.

Failure modes beyond cracking can occur during continuous casting, some of which are more readily identified than others. Described herein are defect types that are generally applicable to ingots, or castings having a generally rectangular profile. Some of these defect types apply to billets having a generally circular profile; however, billet defect types will be addressed further below. For ingots, a bleed out failure or defect is any loss of molten metal through a gap or tear in the ingot shell. A melting or tearing of the shell below the meniscus that dumps molten metal out of the ingot sump is considered a bleed out. Bleed outs can be caused through a variety of issues including a damaged or rough casting bore, excessive speed ramping of the starting head, shallow water ramping of the cooling water, excessive metal head height, or poor metal distribution. Each of these defects can be identified and classified using a first machine learning model. The first machine learning model receives, as input, images or data from non-destructive testing associated with a casting. A defect or anomaly is identified in the images or data using the first machine learning model.

The first machine learning model is trained on a corpus of training data including images and data from non-destructive testing with positively identified defects or anomalies along with their respective types or classifications. Once trained, the first machine learning model is then able to identify a defect or anomaly in the images or data, and to classify the defect or anomaly according to a type or classification of defect or anomaly. The first machine learning model can further identify a severity of the defect.

A defect type of a bleed over on ends is an escape of metal over the top of solidifying metal caused by deformation of the ingot butt (e.g., butt curl) or rapid solidification which occurs when water contacts the ingot as soon as it emerges from the mold. Bleed over on ends can be caused by, among other factors, a cold condition, broken metal distribution bag or poor metal distribution, cold metal, inadequate metal level during secondary butt curl, shallow ramp speed, or excessive water ramping.

Horizontal cracks or tears are generally caused by butt bounce of the casting. The butt bounce is generally caused by the vaporization of water between the bottom of the ingot or billet butt and the starting head. Horizontal cracks or tears can be caused by a lack of starting head water drainage, plugged drain holes, excessively hot start practice, rapid water ramps, or other contributing factors.

Another type of defect is a cold fold, which is a condition where the advanced cooling distance repeatedly freezes the meniscus in the mold, but not severely enough to cause a bleed over. New molten metal fills in behind and continues in a repetitive manner. Cold folds can occur as the result of a cold condition, broken metal distribution bag, poor metal distribution, inadequate metal level, shallow speed ramp, excessive water ramp, or other contributing factors.

A collapsed butt defect is a fracture that starts in the dish out/rim area as a result of insufficient strength to support the ends curling off the block. These cracks are identified by the elevated rim where the crack starts. Collapsed butt defects can occur from, among other factors, inadequate film boiling length (e.g., the steam barrier is not long enough) or the fill time is not long enough.

A corner dribble defect is a condition caused by metal freezing in the corners and new metal bleeding over the top of the solidified metal. Causes of corner dribbles can include rapid secondary curl, cold butt, too much cooling in the corners, a cold condition, broken metal distribution bag or poor metal distribution, inadequate metal level, shallow speed ramp, or excessive water ramp among other factors.

Drag type defects occur when molten aluminum sticks to the mold bore. Drag defects have sufficient surface texture to be visible even over exudated surfaces. Such a defect runs parallel to the cast direction and is generally one to ten millimeters wide. Drags can occur from a variety of factors including: burnt oil or residue on the graphite bore, use of the wrong type of oil, oil that is not adequately absorbed into the graphite liner, a defect in the graphite bore, or a metal tag or damage on the aluminum bore.

Defects in the form of edge lift defects occur at the start of the cast when the periphery of the ingot butt adheres to the mold bore. Edge lift creates a hot spot that can cause cracking or even tear the ingot shell, causing a bleed out. Edge lift can occur from, among other conditions, a starting head not engaged into the mold at the proper position at the start of casting, the mold not being level, starting head engagement being uneven, or the mold bore being damaged.

Flashing type defects can occur along the edges and rolling faces of an ingot, resulting from molten metal entering and solidifying in the gap between the mold and starting head. This can occur when the gap is excessive. Flashing type defects can occur from, among other factors, a mold not properly being aligned with the starting head, the mold not being level, the starting head not being level, or a starting head that has distorted in width over extended use.

A hangup type defect is a condition in which the ingot stops in the mold while the platen and starting head continue down. This is a dangerous situation that can lead to ingot kinks and can potentially submerge molten aluminum in water when the ingot releases from the mold. Hangup type defects can occur for a variety of reasons including: excessive curl, excessively hot conditions, bleed over, negative mold bore taper, or mechanical damage to the mold bore.

A hot butt separation type defect is caused by the cast being started before the butt is sufficiently solidified and strong enough to withstand the starting forces. This can occur when the hold time is too short before starting the starting head movement, the metal is too hot, or from a heat resistant coating on the starting head during a hold/fill sequence.

A hot crack at transition type defect is a separation of solidifying material initiated in the mushy zone (metal coherency zone) that occurs after the platen or starting head starts advancing down, and usually begins during the transition stage where the ingot transitions from start to run parameters. This type of defect often occurs during ramping of speed and water. A hot crack at transition defect can occur when ramping open of the water valve is too late or the total flow of water during the transition is too low. This type of defect can also occur when the water temperature is too high for the water ramp in the current casting process, or the casting speed ramp up is too fast.

A hot crack type defect is a separation of solid material initiated in the mushy zone. This type of crack is generally from an exudate pocket, fold, bump, or smear that forms a stress riser on the thin, hot shell. Heat input may be decreased or cooling increased at the start to avoid such a defect. Some causes of a hot crack type defect can include starting water flow is too low, starting speed or the speed ramp rate is too fast, start metal temperature is too high, water quenchability has changed, or the mold water pattern is defective.

A hot tear type defect is a melting or tearing of the shell below the meniscus. This can be caused by a damaged or rough casting mold bore, excessive speed ramp, shallow water ramp rate, insufficient lubrication, excessive metal head height, or poor metal distribution, for example.

A nuisance crack is a type of defect that includes short cracks near the corner caused by a dissimilar cooling rate between ends (short ends) and the rolling face (long sides). This typically occurs when water quench begins. They can generally be mitigated by allowing more time for the butt to solidify in the mold against the starting head prior to contacting the water.

An oxide patch crack type defect is a flake of aluminum oxide. Localized pockets of extra aluminum oxide float on the head of the ingot until pulled over the meniscus by the movement of the oxide layer on the molten metal. Oxides are insulators and they deflect water, causing a hot spot and stress riser on the shell where cracks may initiate. These oxide patch crack type defects can be caused by moisture or contamination in the starting head creating an oxide patch that is not constrained by the skim dam. Causes can also include cracked, wet, or broken skim dams, or skim dams that are not level or do not penetrate deep enough into the metal head. Causes can further include improper metal head skimming methods.

A water stain type defect can occur from mineral deposits left on an ingot due to film boiling. Water staining is a precursor to a cracked ingot and should be addressed quickly. Causes can include damaged water spray holes in the mold, or an inconsistent or weak water pattern from plugged or shrunk spray or baffle holes.

Kinked ingots or bent ingots are defect types caused by either thermal imbalances or mechanical problems. Causes can include flashing or bleed outs that held the ingot to the starting head at the cast start. Causes can further include lateral shifts in the starting head during descent or uneven but curl. Causes can still further include ingot hang up in the mold due to excessively hot conditions, inadequate mold bore taper, or inadequate mold bore lubrication.

Defect types can include wavy ingots which is a repetitive surface variation across the rolling face of an ingot with a definitive periodicity and amplitude to the waves. This can be caused by excessive oil, excessive run speed, insufficient water flow, or excessive metal levels, for example.

Butt cold cracks are post solidification type defects that start in the butt and typically exhibit on both rolling faces due to the brittle nature of aerospace alloys and extreme contraction forces found in the butt. A massive separation of the metal can occur at any time after solidification. Causes can include that the butt is too weak or has cooled too quickly. The curl transition can be too harsh or the metal chemistry or grain refinement could be poor. In some cases, the alloy is too brittle or the water too cold. Too much water under the ingot at cast start can cause cold cracks. Other causes can include a wiper that is too low, insufficient butt pad size, start defects, or stress risers on the butt such as from drain plugs.

While the above described defect types generally relate to ingot defects, defects of both similar and distinct types occur in billets having a substantially round cross section. While the continuous casting process for billets is similar to that of ingots, the differing cross section and often different sizes lead to distinctions in the process. Thus, some defects, while similar to those of ingots, may have different potential causes. Billets are often cast on mold tables that support a matrix of rows and columns of billet molds. In such cases, the matrix of billet molds may receive molten metal at different flow rates, temperatures, or other disparities that can lead to different problems among the different molds.

Flashing type defects in billets are generally caused by molten metal penetrating the gap between the mold bore and the starting head during the fill operation. This condition is most apparent on billets nearest the metal entry because of higher metal temperatures and velocities. Potential causes of flashing type defects in billets include: molten aluminum entering the mold cavity with too much velocity or turbulence, metal temperature is too hot during the fill, the mold bore is distorted causing a gap with the starting head, the starting head is out of level with the mold bore, the starting head base or mold table is not level, the starting head is not properly engaged or centered with the mold, or the starting head is not within specification. Other causes may also lead to flashing type defects in billets.

Billet butt freeze-in type defects occur when aluminum or other metal freezes completely inside the mold and thimble opening, and the pull of the starting head is insufficient to dislodge the butt from the mold. This may occur on mold positions that are first to fill and have the longest hold times. Among the potential causes are the fill and hold time is too long causing metal to freeze in the mold and thimble opening, cold metal temperature during the fill, or mold damage, for example. Mold damage such as a burr or gap between the transition plate and casting ring or the casing ring and the mold bore may lead to butt freeze-in.

Cold butt separation type defects in billets may occur during the fill and hold operation. This may be caused by metal solidifying inside the thimble opening. In this case, at cast start, molten aluminum does not fully enter into the mold cavity until the solid butt clears the thimble opening. The molten aluminum then floods into the mold cavity and pours over the solid butt, creating a separation. The flooding aluminum can cause flashing that hangs up on the mold bore and a large gap occurs between the solid butt and the billet. Sometimes molten metal bleeds out under the mold bore. This appears similar to metal flashing; however, the bleed out occurs along the butt separation. Causes can include, among others, that the fill and hold time is too long, causing metal to freeze in the mold and thimble opening, cold metal temperature during the fill, or the trough not being sufficiently preheated.

A hot butt separation type defect can be caused by the cast being started before the butt is sufficiently solidified and strong enough to withstand the starting forces. Separation occurs at the top lip inside of the starting head. Molten aluminum can bleed out from this separated area, and looks similar to metal flashing. This type of defect can be caused by: hold time being too short (typically on the last molds to fill), the metal is too hot, mechanical damage to the mold bore, start speed being too fast, casting rings are damaged, or there is build-up of residue in the cavity of the starting head.

Cold folding type defects or cold shuts can occur when the metal meniscus solidifies near the transition plate due to cold conditions. As the solid metal moves away from the transition plate, molten aluminum or other metal floods into the cavity. The process repeats until the temperature condition in the mold becomes hotter and the solidification front moves away from the transition plate, allowing steady state casting to begin. Possible causes include: cold casting conditions, cold water temperature, irregular gas flow through the casting ring, poor transition plate/casting ring joint allowing casting gas to escape, or due to graphite coating the casting ring.

A bleed out type defect is a condition where molten aluminum runs out of an opening in the surface of the billet and spills into the casting pit. Signs of a bleed out include a hissing sound under the mold table and a drop in metal level in the trough. A vortex above the mold indicates that particular mold needs to be plugged off. Bleed outs can occur at any time, but most often occur at the start of a cast. For bleed outs occurring at the start of casting, possible causes include: that the hold time is too short resulting in the butt not being solid or strong enough at start; mechanical damage to the mold bore; butt freeze that can result in a bleed out if the butt falls out or remelts; a sudden drop of the platen at the start of the casting; or metal freezes in the gas pocket or hangs up in the casting ring/transition plate. Bleed outs occurring after cast start can be caused by: a butt freeze-in drops sometime during the cast; insufficient cooling of the billet surface, generally associated with water staining or heavy vertical drags; a mechanical condition inside the mold cavity that is tearing the billet surface; or cast speed is too fast.

Defects that include butt cracking occur when internal stresses exceed the strength or ductility of the material. Stress can be generated during the cooling and shrinkage of a solidifying butt. The stresses are often most severe during the start of a cast when the butt is solidified by heat extraction through the starting head and water quench. Crack prone alloys require a more conservative start practice. Some causes of butt cracking with internal crack type defects include an insufficient grain refiner, hot casting conditions, crack sensitive alloys, uneven fill procedures, uneven water cooling, or build-up of residue in the cavity of the starting head. Butt cracking with external crack type defects can be caused by hot crack prone alloys, insufficient water at start, or a hot butt.

Oxide patch type defects can be caused by oxides that accumulate inside the mold and then release and deposit on the billet surface. An oxide patch is a surface defect and typically does not extend below the billet surface. An oxide release at only the butt can occur as the main source is molten aluminum cascading into the mold during fill. Agitation of the molten aluminum by excess casting gas promotes the release of oxides during the start. Generally, larger molds produce larger oxide releases. Magnesium containing alloys can produce thicker oxides. Oxide releases randomly released along the full length of the billet may be due to a problem with the metal quality, excessive cast gas, moisture, or insufficient oxygen in the casting gas. Oxide patches only at the butt can be caused by: moisture in the trough, thimble or transition plate; bubbling from the mold or a rocking in the trough promoting oxide release; or poor surface conditions of the transition plate, such as roughness, coating, or joints that retain oxide in the mold. Oxide patches along the full length of the billet can be caused by: insufficient oxygen in the casting gas, melt preparation and fluxing practices generating salts carrying oxides, excessive bubbling from the mold due to high gas flows, moisture in the casting gas, or moisture in the transition plate.

Defects can include a situation where an air gap between the walls of the mold and the casting is compromised. This can occur when the gas bearing between the aluminum and casting ring is lost and the aluminum contacts the casting ring causing a deterioration of the billet surface quality. Friction between the billet and the casting ring can eventually lead to a tearing of the billet surface. The longer a billet is in contact with a mold wall, the more oil is consumed making it easier for the molten aluminum to attach to the casting ring. Common causes can include: low casting gas flow; casting conditions too hot; casting conditions too cold; loss of casting gas from the joint between the mold bore and the casting ring; insufficient casting oil; excessive casting oil which can restrict gas flow; oxide buildup at the transition plate; burned oil on the graphite ring; loss of casting gas from the mold cavity; or leaking casting gas system.

Horizontal tear type defects are often caused by molten aluminum that attaches to the inside of the mold and can result in a bleed out. Common causes can include: release coating on the casting ring surface; metal attached to the casting ring/transition plate joint; low casting gas or oil flow in a section of the casting ring; mechanical damage to the casting ring; or damage or cracks in the transition plate.

A vertical tear or zipper type defect is a deep scratch in the billet surface, often caused by a protruding obstruction inside the mold that touches the semisolid billet. This can be caused by a burr on the aluminum mold bore that tears the billet surface as it leaves the mold. Common causes can also include a metal buildup attached to the casting ring and transition plate joint which alters the metal flow as it solidifies, metal attached to a cracked or damaged casting ring surface, or metal in the gap between the bottom of the casting ring and the mold bore.

Lap lines are a type of defect that includes small, closely spaced horizontal lines that may be pronounced enough to be felt. Common causes can include a high casting gas flow causing rocking or bubbling in the trough or a rough or jerky platen. Liquation type defects occur when the billet surface has reheated inside the mold which causes the area to remelt, forming a rough texture or welts on the cast surface. Liquation occurs on alloys with a wide freezing range and can be caused by improper thermal balance.

Speed crack type defects can occur when the casting speed is high enough to cause a large temperature difference between the center and the outer surface of the billet. Non-destructive testing can be used to determine where the crack starts and ends. Common causes can include: excessive start or run speed, plugged water filter screens, plugged holes in the mold, ineffective grain refiner, hot casting conditions, or crack sensitive alloys.

Surface pimple type defects are often caused by high hydrogen levels in the molten aluminum. Hydrogen bubbles penetrate the surface of the billet during solidification and leave a rough sandpaper like surface. Pimple concentrations that are high at the start and diminish as the cast progresses may be due to moisture coming from the trough. Surface pimple type defects proximate the butt can be caused by moisture in the trough or inadequate degassing for the initial metal flow rate, for example. Surface pimple type defects along the length of the casting can be a result of inadequate metal degassing or inadequate water quenching, for example.

Surface blister type defects may appear on the surface of the billet after homogenization and may be formed by small pockets of expanding hydrogen. Blister concentrations that are high at the butt of the billet and diminish along the length may be due to moisture coming from the trough. Surface blisters proximate the butt may be caused by moisture in the trough or inadequate degassing for the initial metal flow rate, for example. Surface blisters along the length of the billet may be due to inadequate metal degassing or inadequate water quench, for example.

Spiraling type defects or "barberpoling" type defects are a winding depression on the billet surface that can resemble a screw thread. This occurs mostly on smaller diameter billets during the last 50% of the cast length. Often this is caused by a mechanically unstable platen or hot cast conditions. Spiraling in a single mold can be caused by plugged water passages or mold bore distortion affecting the water pattern. Spiraling where the defect stays with the table can be caused by plugged water passages or an unstable starting head. Spiraling on many molds can be caused by high water temperature, high metal temperature, hot casting conditions, or an unstable or jerky platen.

Distorted cooling ring type defects are noncircular bands on the head of the billet showing variations in billet solidification. This is not a defect by itself but indicates a water cooling problem. Possible causes include a weak or broken water pattern caused by plugged waters screens or mold water passages or by a distorted mold bore.

Water stain type defects are a surface condition often caused by calcium carbonate depositing onto the billet surface. It is usually a result of a hot billet surface condition and is amplified by hard water. Extreme cases can result in localized defects such as drags, welts, or small horizontal tears on the billet surface. Water staining occurring on a single mold can be caused by broken mold water patterns caused by blocked water passages or weak mold water patterns due to plugged water filter screens. If the staining occurs on many molds, the causes can include plugged water filter screens, low water flow rates, or high water temperatures.

Vertical drag type defects can be caused by metal sticking to the casting ring surface and disrupting smooth formation of the billet surface. Alloys of 2XXX and 7XXX series aluminum are very prone to dragging. If drags become severe due to hot casting conditions, a bleed out can occur. Causes of vertical drags can include: cold casting conditions, hot casting conditions, metal attachment in the casting ring/transition plate joint, graphite coating left on the casting surface causing metal attachment, gas flow too low, oil flow too low, low oil flowing through the casting ring, oil flow is too high with excess oil in the casting ring causing a reduction in gas flow, poor metal quality causing oxides to attach more readily to the mold interior, broken or weak water pattern, mechanical damage to the casting ring, or insufficient oxygen in the casting gas.

Bent billet defects have either a very gradual bow over the entire length of the billet or a sudden kink or bend. Bent billets are often caused by either a thermal imbalance or a mechanical problem respectively. Uneven water flow around a billet circumference can cause internal stresses, gradually bending the billet. Sudden bends in the billet are often due to mechanical disturbances, such as irregular platen travel. A thermally caused bent billet can be caused by a broken or weak water pattern causing uneven cooling or hot casting conditions. A mechanically bent billet can be the result of an unstable starting head causing bending to a specific mold position, bending at all mold positions due to a mechanical misalignment or shift in the platen guidance system, a gradual bend over the entire billet length due to platen and guide misalignment, a kinked billet indicating the butt lifted from the head during the start, then repositioned itself during the cast, mold table or starting head base out of level, or a grid guard is distorted and separates from the starting head base unevenly causing platen movement.

Metal tags on the billet head are another defect type that forms due to molten aluminum sticking to specific locations inside the mold. At the end of the cast, the stuck aluminum raises above the head until the sump solidifies. Metal tags disrupt the even flow of molten aluminum and create a cooler casting condition on the billet and hotter condition on the mold. These conditions create surface defects such as vertical disturbances. The location of the metal tag corresponds to the problem area in the mold that may require maintenance. Causes can include improper application of release coating on the transition plate, metal attaching to a chip or crack in the transition plate during the cast, or poor metal quality for example.

Oxide buildup on the billet head is another defect type that forms a black ring that accumulates inside the metal tag. The oxide buildup can break loose as a patch and deposit on the billet surface. In extreme cases, oxide buildup can prevent the billet from forming a proper air gap at the beginning of the cast or cause the air gap to be compromised.

As evident from the aforementioned defect types and potential causes, various defects can occur from a variety of factors. Further, there is substantial overlap in the contributing factors contributing to various different types of defects. Thus, it is challenging to discern what specific factors may contribute to a specific defect type. Embodiments described herein employ a machine learning model that uses techniques and training data to identify contributing factors while eliminating other potentially contributing factors to provide accurate parameter value determination for mitigating defects and improving the quality of castings. The machine learning model and techniques can consider the interplay among the various parameters when determining the cause of a defect type, and recommend parameter value or set-up changes for parameter determination.

The following figures relate to techniques employed in machine learning models to receive, as input, a defect type, location, and magnitude to establish how to mitigate the defects through parameter value determination.

To sort and grade cracks, the cracks may be given a name as in a type of crack along with a corresponding position, a priority (e.g., 1-25), a level of severity (e.g., A (least severe) to C (most severe)), and a quantity. For example, a "transition valve crack 5.C.3" is a crack with a level 5 priority (of 25), level C severity (severe), and a quantity of three. FIG. 10 illustrates an example listing of crack priorities and severities based on a position of the crack, crack requirements, a length of the crack, and where required a type of alloy cast. As shown at the top of the list, a crack starting at the rim is a nuisance crack type of defect with a length of less than or equal to two inches. This type of crack is given a priority of 25 (lowest) and a severity of A (moderate). This type of crack is deemed of low priority as it is primarily a nuisance and does not substantially impact the quality of the casting given its location and severity.

Conversely, at the bottom of the listing of FIG. 10, a crack that begins after a transition to steady state and is more than 12-inches long with horizontal cracks off of the main crack, in a 2xxx or 7xxx alloy is considered a herringbone crack. At 12-20-inches long, the severity is level A (moderate). At more than 40-inches long, the severity is level C (severe). FIG. 11 illustrates a similar list of end face cracks with a position, a priority, and a level of severity. These lists can be stored in a table or used in training data for the defect identification/classification model as described above.

Identifying the defects, such as defects listed in FIG. 3 or 4, solves the defect identification problem. However, determining how to resolve these defects and mitigate them in future castings requires the parameter value determination model described herein. The parameter value determination model can consider past casting operations and the successes or defects of those operations. The parameter value determination model, in a simplistic form, can be thought of as a technique that conducts if-then analysis of the identified defect relative to previously successful or at least previously more successful casting operations.

According to an example embodiment, a technique of the parameter value determination module may receive as input the identification of a nuisance crack of less than two inches at the rim of a casting. The technique may first establish if curl is less than 30 millimeters. If the curl is less than 30 mm and there are not other defects, the casting may be considered relatively successful and no action is taken in the parameter value determination technique. If curl is greater than 30 mm and there are no other defects, the technique may then check grain refiner inoculation. If the inoculation to troughs was typical for the cast alloy and size combination, it may be established that inoculation was not an issue. If the inoculation to troughs was not typical, the parameter value determination technique may alert operators of improper trough inoculation. Similarly, several other parameters may be checked or verified to confirm if they were properly set or performed for the casting operation relative to prior successful casting operations.

For example, a grain refiner feed rate may be confirmed, a fill time of the mold may be confirmed, water temperature, metal temperature, starting head speed, etc. can be compared against those same parameter values that were used during successful casting operations. If any of the parameter values were not properly set or applied, the parameter value determination model can output corrective actions and parameter values that are believed to improve the quality of the casting through reducing the defects. Successful castings with little or no defects can be used as inputs to the second machine learning model, along with their associated casting parameter values. These are benchmarks of successful combinations of parameter values that led to a quality casting. The second machine learning model also uses as inputs identified and classified defects along with the parameter values associated with their castings. These inputs can teach the machine learning model what parameters can impact the quality of the casting to better inform how parameter values may be changed to minimize defects or anomalies.

FIGS. 5-25 illustrate static versions of techniques that can be employed by the second machine learning model. Static versions of the techniques are examples of how a machine learning model may process inputs of various defects. In a machine learning context, the techniques are dynamic as they are informed by machine learning training data such as the defect-free castings and their associated casting parameter values along with castings having classified defects and their associated casting parameter values. These inputs can alter the illustrated techniques of FIGS. 5-25 as will be described further below.

A technique to identify operating parameter value adjustments and determination for an identified nuisance crack of less than two inches at the rim is illustrated in FIG. 12. The technique shown in FIG. 12 uses an iterative process to identify probable conditions that caused a defect and can recommend parameter value determination to mitigate the defect going forward. The less than two-inch nuisance crack is identified as a level 25 priority, and level 1 severity. In a machine learning context, the water and metal temperatures for historically successful casts are dynamic values that can change with the various inputs to the machine learning model. Similarly, fill times recited in the technique of FIG. 12 can vary over different castings, such that the technique of FIG. 12 can have differing median fill times to reference as the machine learning model obtains a greater corpus of training data.

FIG. 13 illustrates a technique for addressing a nuisance crack starting at the rim of less than two inches. FIGS. 14 and 15 illustrate a technique for addressing a start hot crack starting at the rim that is less than 12-inches long and less than 3 mm wide. FIG. 16 illustrates the major process summary blocks that feed into the second machine learning module. The flow chart shows the main parameter and set-up combinations needed for machine learning module 2 to capture the critical inputs and perform the specified functions and combinations of operations. It will also be understood that one or more blocks of the flowcharts, and combinations of blocks in the flowcharts, can be implemented by special purpose hardware-based computer systems that perform the specified functions, or combinations of special purpose hardware and computer instructions.

FIGS. 17 and 18 illustrate top level flowcharts depicting methods according to example embodiments of the present disclosure. It will be understood that each block of the flowchart and combination of blocks in the flowchart may be implemented by software through various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored in a memory of an apparatus employing an embodiment of the present disclosure and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented processes such that the instructions that execute on the computer or other programmable apparatus provide operations for implementing the functions specified in the flowchart blocks.

An operation of an example apparatus will herein be described with reference to the flow chart of FIG. 17. The illustrated method may be performed, for example, by the apparatus using a processor with program code instructions stored in a memory to cause the apparatus to perform the operations of the method of FIG. 17 As shown at 310, at least one image of a casting surface of a casting that has been cast using a first set of casting parameter values. The at least one image is processed through a first machine learning model at 320 as input. Output from the first machine learning model is obtained at 330 and classified at 335. If there is at least one casting anomaly classified. The at least one classification is processed as an input at 340 to a second machine learning model. At 350, the second machine learning model produces an output indicating casting parameter value changes to be made to the first set of casting parameter values to arrive at a second set of casting parameter values.

FIG. 18 illustrates another process of example embodiments described herein. As shown, data corresponding to at least one casting defect of a casting that has been cast with a first set of casting parameter values is received at 410. The data is processed as input to a first machine learning model at 420. At least one classification is received from the first machine learning model at 430, where the at least one classification includes at least one casting defect classification. The at least one classification is processed as input to a second machine learning model at 440. At 450, an indication of casting parameter value changes to be made to the first set of casting parameter values are received to arrive at a second set of casting parameter values.

FIG. 19 illustrates another process of example embodiments described herein. As shown, stitched together photographs (e.g., digital images) or video of ingot surfaces are reviewed by an AI source that is trained based on example images to identify defects from the variable background of cast products at 510. The defects are then classified by if/then statements to create an input data stream to the AI learning module according to a classification of the defect at 520. The AI learning module, at 530, receives the specific anomaly classifications from the if/then classifier, joining this with all of the captured process data (e.g., casting parameters and set-up conditions). The AI learning module, at 540, then processes the data with all previous data using neural networks to determine what the most likely cause of the defect was on the particular cast. At 550 an indication is received from the second machine learning model of changes to casting parameter values or set-up conditions to be made to the first set of casting parameter values and set-up conditions to arrive at a second set of casting parameter values and set-up conditions.

FIG. 20 illustrates still another process of example embodiments described herein. As shown, cast product surface data is received at 610. A machine learning model (ML1) is applied at 620 to identify cast product defects in the surface data and classify them with a defect classifier. Another machine learning model (ML2) receives the specific anomaly classifications at 630 from ML1 and the classifier, joining this with all of the captured process data (casting parameter values and set-up conditions). The ML2 module then processes all data from the original training data along with this new data using neural networks or similar machine learning techniques to determine the most likely process and set-up changes to create success on the next cast. At 650, information is received from the second machine learning model regarding casting parameter values or set-up conditions to be made to the first set of casting parameter values and set-up conditions to arrive at a second set of casting parameter values and set-up conditions.

In an example embodiment, an apparatus for performing the methods of FIG. 17, 18, 19, or 20 above may include a processor configured to perform some or each of the operations (310-380) described above. The processor may, for example, be configured to perform the operations (310-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-350 may comprise, for example, the processor and/or a device or circuit for executing instructions or executing an algorithm for processing information as described above.

Many modifications and other embodiments of the inventions set forth herein will come to mind to one skilled in the art to which these inventions pertain, having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of parameter value determination for direct chill casting comprising:

obtaining at least one image of a surface of a casting that has been cast with a first set of casting parameter values and set-up conditions, wherein the at least one image of the surface of the casting includes at least one casting anomaly;

processing the at least one image of the surface of the casting through a first machine learning model as an input;

receiving, from the first machine learning model and a classifier, at least one classification as an output, wherein the at least one classification comprises at least one casting anomaly classification;

processing the at least one classification as an input to a second machine learning model; and receiving, from the second machine learning model, an indication of at least one of casting parameter value or set-up condition changes to be made to the first set of casting parameter values or set-up conditions to arrive at a second set of casting parameter values and set-up conditions, wherein the second set of casting parameter values and set-up conditions are intended to reduce or eliminate casting anomalies associated with the at least one classification.

2. The method of claim 1, wherein the first machine learning model is a deep neural network.

3. The method of claim 1, wherein the first machine learning model is a classification engine.

4. The method of claim 1, wherein the at least one casting anomaly comprises one or more of:

butt curl, cold folding, cracking, oxide patches, tears, folds, lap lines, liquation, surface pimples, surface blisters, profile, steam stains, spiraling or bleed-out/over.

5. The method of claim 1, wherein the first set of casting parameter values comprise values for one or more of:

casting material temperature, casting material chemistry, water temperature, water chemistry, start water flow rate, start water delay, water ramp rate, and run water flow rate, casting start speed, speed delay, speed ramp and run speed, processing equipment preheat temperatures, metal level, metal level ramping, fill rate, pin position, butt curl control process parameters, or casting gas flow rate.

6. The method of claim 1, wherein receiving, from the first machine learning model, at least one classification as an output further comprises at least one corresponding size measurement and cast length location of the at least one casting anomaly.

7. The method of claim 1, wherein processing the at least one image of the surface of the casting through a first machine learning model as input further comprises processing the at least one image of the surface of the casting and a location of the at least one casting anomaly.

8. The method of claim 7, wherein the input further comprises an indication of a size of the at least one casting anomaly.

9. A method of parameter value determination for direct chill casting comprising:

receiving cast product surface data containing at least one casting defect of a casting that has been cast with a first set of casting parameter values and set-up conditions;

determining, from the data, at least one classification as an output, wherein the at least one classification comprises at least one casting defect classification;

processing the at least one classification as an input to a second machine learning model; and receiving, from the second machine learning model, an indication of at least one of casting parameter value or set-up condition changes to be made to the first set of casting parameter values and set-up conditions to arrive at a second set of casting parameter values and set-up conditions, wherein the second set of casting parameter values and set-up conditions are intended to reduce or eliminate the at least one casting anomaly.

10. The method of claim 1, wherein determining, from the data, the at least one classification as the output comprises determining, using a first machine learning model, the at least one classification as the output.

11. The method of claim 9, wherein processing the at least one classification as the input to the second machine learning model further comprises processing the at least one classification along with the first set of casting parameter values and set-up values as the input to the second machine learning model.

12. The method of claim 11, wherein the data comprises at least one of image data or non-destructive analysis data.

13. The method of claim 12, wherein the non-destructive analysis data is collected using one or more of photographs, laser profile testing, photogrammetry, linear displacement testing, Eddy Current testing, Magnetic Testing, Thermographic Testing, Resonant Testing, Radiographic Testing, or Ultrasonic Testing.

14. The method of claim 12, wherein the at least one classification further comprises a priority of the at least one casting defect and a severity of the at least one casting defect.

15. The method of claim 9, wherein the first machine learning model is a classification engine.

16. The method of claim 9, wherein the at least one casting defect comprises one or more of:

butt curl, cold folding, cracking, oxide patches, tears, folds, lap lines, liquation, surface pimples, surface blisters, profile, steam stains, spiraling or bleed-out/over.

17. The method of claim 9, wherein the first set of casting parameter values comprise values for one or more of:

casting material temperature, casting material chemistry, water temperature, water chemistry, start water flow rate, start water delay, water ramp rate, and run water flow rate, casting start speed, speed delay, speed ramp and run speed, processing equipment preheat temperatures, metal level, metal level ramping, fill rate, pin position, butt curl control process parameters, or casting gas flow rate.

18. An apparatus comprising at least one processor and at least one memory including computer program code, the at least one memory and computer program code configured to, with the processor, cause the apparatus to at least:

receive data corresponding to at least one casting defect of a casting that has been cast with a first set of casting parameter values;

process the data as input to a first machine learning model;

receive, from the first machine learning model, at least one classification as an output, wherein the at least one classification comprises at least one casting defect classification;

process the at least one classification as an input to a second machine learning model; and receive, from the second machine learning model, an indication of casting parameter value changes to be made to the first set of casting parameter values to arrive at a second set of casting parameter values, wherein the second set of casting parameter values are intended to reduce or eliminate the at least one casting defect.

19. The apparatus of claim 18, wherein causing the apparatus to process the at least one classification as the input to the second machine learning model further comprises causing the apparatus to process the at least one classification along with the first set of casting parameter values as the input to the second machine learning model.

20. The apparatus of claim 19, wherein the at least one classification comprises a priority and a severity of the at least one casting defect.

* * * * *